United States Patent [19]

Tsubaki et al.

[11] Patent Number: 5,654,369
[45] Date of Patent: Aug. 5, 1997

[54] ANTISTATIC THERMOPLASTIC RESIN COMPOSITION

[75] Inventors: Takayuki Tsubaki; Yutaka Nakayama, both of Kyoto; Hideyuki Sumi, Osaka; Hiroshi Hotta, Kyoto, all of Japan

[73] Assignee: Dai-Ichi Kogyo Seiyaku Co., Ltd., Kyoto, Japan

[21] Appl. No.: 681,023

[22] Filed: Jul. 22, 1996

[30] Foreign Application Priority Data

Jul. 25, 1995 [JP] Japan .................... 7-189137

[51] Int. Cl.$^6$ .................. C08L 25/04; C08L 23/04; C08L 23/10; C08L 67/02
[52] U.S. Cl. .................. 525/205; 525/64; 525/66; 525/67; 525/71; 525/73; 525/74; 525/148; 525/166; 525/175; 525/176; 525/179; 525/182; 525/183; 525/207; 525/217; 525/218
[58] Field of Search ................. 525/64, 66, 67, 525/71, 73, 74, 148, 166, 175, 176, 179, 182, 183, 205, 207, 217, 218

[56] References Cited

U.S. PATENT DOCUMENTS 5,202,193  4/1993  Sumi .................... 428/479.6

FOREIGN PATENT DOCUMENTS

| | | |
|---|---|---|
| 58-39860 | 9/1983 | Japan . |
| 62-121717 | 6/1987 | Japan . |
| 64-54041 | 3/1989 | Japan . |
| 1-29820 | 6/1989 | Japan . |
| 1-170603 | 7/1989 | Japan . |
| 4-5691 | 2/1992 | Japan . |
| 4-198308 | 7/1992 | Japan . |
| 5-212079 | 8/1994 | Japan . |
| 2112789 | 7/1983 | United Kingdom . |

*Primary Examiner*—David Buttner
*Attorney, Agent, or Firm*—Jordan and Hamburg

[57] ABSTRACT

The invention provides a thermoplastic resin composition uniformly and permanently rendered antistatic which comprises (A) 100 parts by weight of a thermoplastic resin, (B) 3–30 parts by weight of a cationic copolymer comprising 80–98 mol % of an ethylene unit and 2–20 mol % of a cationic unit and having a weight-average molecular weight of 1,000–50,000, and (C) 0.1–10 parts by weight of a copolymer comprising at least one unit each per molecule of a structural unit of formula (4)

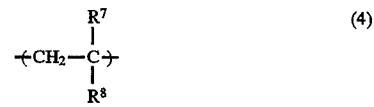

and a structural unit of formula (5)

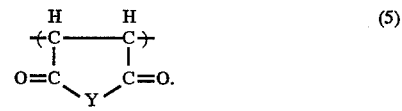

4 Claims, 1 Drawing Sheet

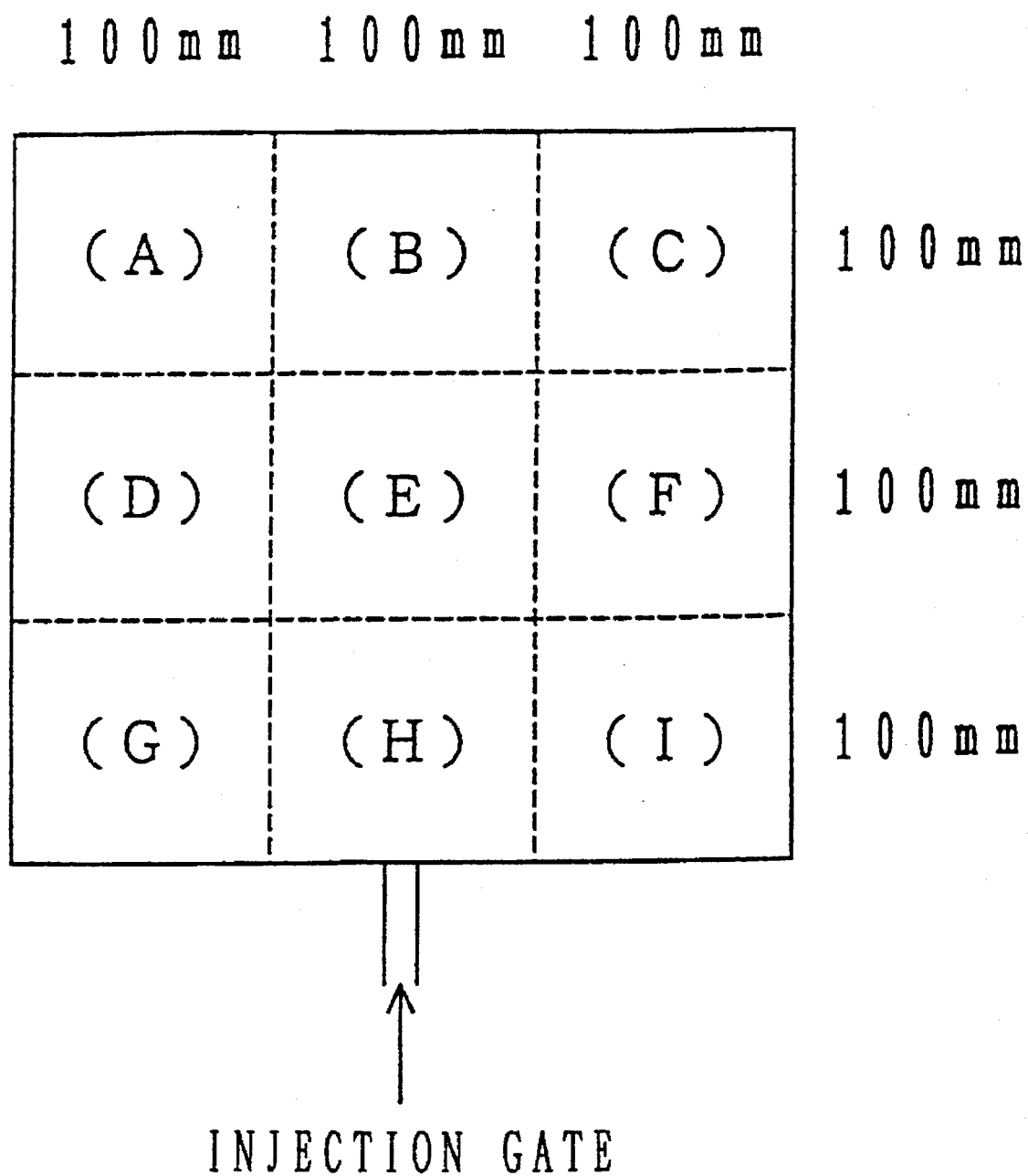

1

ANTISTATIC THERMOPLASTIC RESIN COMPOSITION

FIELD OF THE INVENTION

The present invention relates to a thermoplastic resin composition. In particular, the invention relates to a thermoplastic resin composition for use in the production of molding products rendered uniformly and permanently antistatic. More particularly, the present invention relates to a thermoplastic resin composition providing molding products rendered antistatic with a reduced amount of an antistatic agent as compared with prior art compositions.

BACKGROUND OF THE INVENTION

Thermoplastic resins including polyolefin, ABS and vinyl chloride resins are universally used as packaging materials in various forms such as film, bag, etc. and as raw materials for automotive and other industrial parts. However, these resins have the serious drawback that they generally have high electric resistance values and, therefore, are easily charged electrostatically on friction for dust particles to stick.

Therefore, attempts have recently been made to impart antistatic properties to thermoplastic resin products by using antistatic agents in the following alternative ways (1) and (2).

(1) Coating the surface of a resin product with an antistatic agent and drying it.

(2) Milling an internal antistatic agent into a matrix resin.

In method (1), a surfactant solution is used as the antistatic agent. However, such an antistatic agent is readily removed upon washing of the resin product so that no permanent antistatic property can be imparted.

In method (2), glycerin fatty acid esters, sorbitan fatty acid esters, alkyldiethanolamides, sodium alkylbenzenesulfonates, alkylimidazole quaternary salts, etc. are generally used as the internal antistatic agent. In such cases, even if the antistatic agent on the resin surface is washed off, the loss is made up for by a fresh supply of the antistatic agent bleeding out from within the resin so that the imparted antistatic properties are retained for a comparatively long time.

However, when such an internal antistatic agent is employed, it takes time after washing for the antistatic properties to be restored and in the event of excessive bleeding-out of the antistatic agent, the resin becomes tacky to attract dust rather more readily. Moreover, because these antistatic agents are generally of low molecular weight, the antistatic agent added is evaporated by heat in the course of high-temperature molding so that the antistatic agent must be incorporated in a greater amount than necessary and it has been found difficult to optimize the level of addition of the antistatic agent.

Recently, to overcome the above-mentioned disadvantages of the conventional antistatic technology involving the use of an internal antistatic agent, a large number of resin compositions with perpetuated antistatic properties have been developed by alloying a thermoplastic resin with a macromolecular compound containing antistatic functional groups which is generally called a permanent antistatic agent. Among the antistatic agents heretofore proposed are a polymethyl methacrylate in which 20–80 mol % of methoxy groups have been modified by diethanolamine (JP-A-01170603), an alkoxy-polyethylene glycol methacrylate graft copolymer (JP-B-58039860), a cationic polymer derived from a styrene-maleic anhydride copolymer by imidation and subsequent quaternization (JP-B-01029820), a comb-shaped copolymer prepared by alloying a macromolecular monomer available on conversion of the terminal carboxyl groups of a carboxy-terminated polymethyl methacrylate to methacryloyl groups using glycidyl methacrylate with an aminoalkyl-acrylic acid ester or acrylamide or a quaternized cationic version thereof (JP-A-62121717), and a polyalkylene oxide chain-containing polyetheresteramide (JP-B-04005691), and a variety of compositions containing any of these antistatic agents in combination with various thermoplastic resins have been proposed.

However, the permanent antistatic agents mentioned above invariably detract from the strength, elongation and other physical properties of resins and, moreover, are not fully satisfactory in antistatic performance and its endurance.

In addition, an attempt has been made to provide an electrically conductive resin product by molding a copolymer composed of 40–90 weight % of ethylene and 60–10 weight % of a dialkylaminoalkyl (meth)acrylamide and immersing the molding in an inorganic acid salt solution (JP-A-64054041).

However, this technology involves an additional step of immersion and has proved disadvantageous in commercial application.

To obviate the above drawbacks of the conventional macromolecular compound containing antistatic functional groups, the inventors of the present invention proposed a polyethylene copolymer having a quaternary ammonium base-containing acrylamide unit (JP-A-04198308). With this copolymer, excellent antistatic properties and satisfactory endurance of the properties are assured and, in the form of film, high strength and elongation characteristics are achieved, thus overcoming most of the above-mentioned disadvantages. However, when the resin composition is injection- or otherwise molded, the thermal deformation and other thermal characteristics are not as satisfactory as desired, thus interfering with the application of the composition to three-dimensional articles.

Meanwhile, the inventors of the present invention further proposed a thermoplastic resin composition insuring improvements in the thermal characteristics of moldings (JP-A-06212079) but When this composition is applied to the production of large-sized articles such as TV cabinets and copying machine housings or films of large surface area, the distribution of antistatic properties (e.g. surface resistivity) is sometimes not uniform.

Meanwhile, in view of the adverse effects of an antistatic agent added on the matrix resin (deterioration of physical properties of the resin) and production economics, reductions in the level of addition of antistatic chemicals have been demanded and much research for meeting the demand is being carried out.

Developed in view of the above state of the art, the present invention has for its object to provide a thermoplastic resin composition which is improved in thermal characteristics (for example, reduced liability to undergo thermal deformation) and highly antistatic with a minimum of variation in the distribution of antistatic properties even if molded into an article of large surface area (uniformity of antistaticity) at a reduced addition level of an antistatic agent.

SUMMARY OF THE INVENTION

Developed to overcome the above-mentioned disadvantages of the prior art, the thermoplastic resin composition as an embodiment of the present invention comprises (A) 100 parts by weight of a thermoplastic resin, (B) 3–30 parts by weight of a cationic copolymer comprising a structural unit of formula (1) and a structural unit of formula (3)

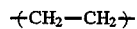  (1)

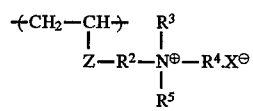  (3)

(wherein Z represents

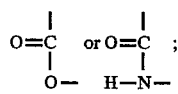

$R^2$ represents ethylene or propylene; $R^3$ and $R^4$ independently represent methyl; $R^5$ represents linear lower alkyl or aralkyl; X represents halogen, $CH_3OSO_3$, $CH_3CH_2OSO_3$, or $R^6SO_3$, where $R^6$ represents $C_{1-8}$ alkyl or aralkyl), said ethylene unit of formula (1) and cationic unit of formula (3) accounting for 80–98 mol % and 2–20 mol %, respectively, of the copolymer, and having a weight-average molecular weight of 1,000–50,000, and (C) 0.1–10 parts by weight of a copolymer comprising at least one unit each per molecule of a structural unit of formula (4)

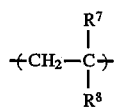  (4)

(wherein $R^7$ represents hydrogen or methyl; $R^8$ represents hydrogen, $C_{1-42}$ alkyl, phenyl, or $COOR^9$, where $R^9$ represents $C_{1-4}$ alkyl) and a structural unit of formula (5)

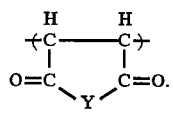  (5)

(wherein Y represents O or N-$R^{10}$, where $R^{10}$ represents hydrogen, $C_{1-14}$ alkyl, aryl, aralkyl, $R^2$-$N^{\oplus}R^3R^4R^5.X^{\ominus}$, or $R^2$-$NR^3R^4$; $R^2$~$R^5$ and X are as defined hereinbefore) and having a weight-average molecular weight of 800–200,000.

The thermoplastic resin composition as another embodiment of the present invention comprises (A) 100 parts by weight of a thermoplastic resin, (B) 3–30 parts by weight of a cationic copolymer comprising a structural unit of formula (1), a structural unit of formula (2), and a structural unit of formula (3)

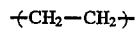  (1)

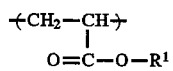  (2)

(wherein $R^1$ represents methyl or ethyl and may be the same or different over all structural units)

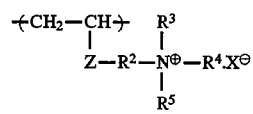  (3)

wherein Z represents

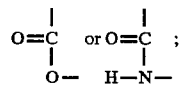

$R^2$ represents ethylene or propylene; $R^3$ and $R^4$ independently represent methyl; $R^5$ represents linear lower alkyl or aralkyl; X represents halogen, $CH_3OSO_3$, $CH_3CH_2OSO_3$, or $R^6SO_3$, where $R^6$ represents $C_{1-8}$ alkyl or aralkyl), said ethylene unit of formula (1), acrylate unit of formula (2), and cationic unit of formula (3) accounting for 79.9–97.9 mol %, not more than 15 mol %, and 2–20 mol %, respectively, of the copolymer, and having a weight-average molecular weight of 1,000–50,000, and (C) 0.1–10 parts by weight of a copolymer comprising at least one unit each per molecule of a structural unit of formula (4) and a structural unit of formula (5)

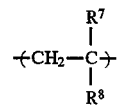  (4)

(wherein $R^7$ represents hydrogen or methyl; $R^8$ represents hydrogen, $C_{1-42}$ alkyl, phenyl, or $COOR^9$, where $R^9$ represents $C_{1-4}$ alkyl)

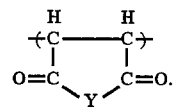  (5)

(wherein Y represents O or N-$R^{10}$, where $R^{10}$ represents hydrogen, $C_{1-14}$ alkyl, aryl, aralkyl, $R^2$-$N^{\oplus}R^3R^4R^5.X^{\ominus}$, or $R^2$-$NR^3R^4$; $R^2$~$R^5$ and X are as defined hereinbefore) and having a weight-average molecular weight of 800–200,000.

The thermoplastic resin composition as a still another embodiment of the present invention comprises (A) 100 parts by weight of a styrenic thermoplastic resin, (B) 1–15 parts by weight of an antistatic cationic copolymer comprising a structural unit of formula (1) and a structural unit of formula (3),

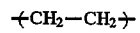  (1)

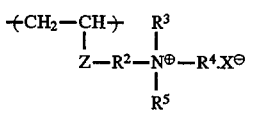  (3)

(wherein Z represents

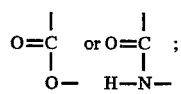

$R^2$ represents ethylene or propylene; $R^3$ and $R^4$ independently represent methyl; $R^5$ represents linear lower alkyl or aralkyl; X represents halogen, $CH_3OSO_3$, $CH_3CH_2OSO_3$, or $R^6SO_3$, where $R^6$ represents $C_{1-8}$ alkyl or aralkyl), said ethylene unit of formula (1) and cationic unit of formula (2) accounting for 80–98 mol % and 2–20 mol %, respectively, of the copolymer, and having a weight-average molecular weight of 1,000–50,000, and (C) 0.05–5 parts by weight of a copolymer comprising at least one unit each per molecule of a structural unit of formula (4) and a succinic anhydride unit of formula (5) either in the backbone chain or in a side chain

(4)

(wherein $R^7$ represents hydrogen or methyl; $R^8$ represents hydrogen or $C_{1-42}$ alkyl and may mean a mixture thereof within the same copolymer molecule).

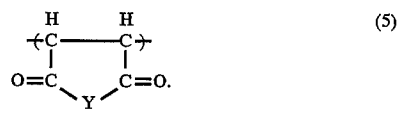
(5)

and having a weight-average molecular weight of 800–200,000.

The thermoplastic resin composition as a further embodiment of the present invention comprises (A) 100 parts by weight of a styrenic thermoplastic resin, (B) 1–15 parts by weight of an antistatic cationic copolymer comprising a structural unit of formula (1), a structural unit of formula (2), and a structural unit of formula (3), $$-\!\!(\!CH_2-CH_2\!)\!\!- \quad (1)$$

(2)

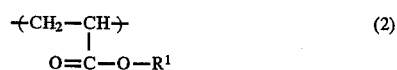
(3)

(wherein $R^1$ represents methyl or ethyl and maybe the same or different over all structural units)

(wherein Z represents

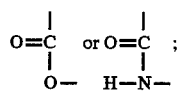

$R^2$ represents ethylene or propylene; $R^3$ and $R^4$ independently represent methyl; $R^5$ represents linear lower alkyl or aralkyl; X represents halogen, $CH_3OSO_3$, $CH_3CH_2OSO_3$, or $R^6SO_3$, where $R^6$ represents $C_{1-8}$ alkyl or aralkyl ), said ethylene unit of formula (1), acrylate unit of formula (2), and cationic unit of formula (3) accounting for 79.9–97.9 mol %, not more than 15 mol %, and 2–20 mol %, respectively, of the copolymer, and having a weight average molecular weight of 1,000–50,000, and (C) 0.05–5 parts by weight of a copolymer comprising at least one unit each per molecule of a structural unit of formula (4) and a structural unit of formula (5) either in its backbone chain or in a side chain

(4)

(wherein $R^7$ represents hydrogen or methyl; $R^8$ represents hydrogen or $C_{1-42}$ alkyl and my mean a mixture thereof within the same copolymer molecule).

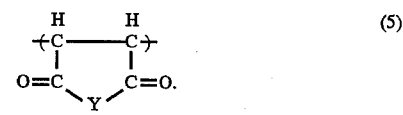
(5)

and having a weight-average molecular weight of 800–200,000.

BRIEF DESCRIPTION OF THE DRAWING

FIG. 1 is a plan view of the testpiece used in electrical tests.

DETAILED DESCRIPTION OF THE PREFERRED EMBODIMENTS

Component (A)

The thermoplastic resin that can be used in the composition of the present invention includes but is not limited to polyolefins, polyvinyl chloride, styrenic resins [styrene homopolymer (polystyrene), copolymers of styrene with other copolymerizable monomers (ABS resin etc.), polymer alloys of polystyrene or styrene copolymers with other thermoplastic resins, etc. ], (meth)acrylic resin, polyamide, polyester, polycarbonate, and modified polyphenyleneether, and these thermoplastic resins can be used either independently or in alloyed or otherwise mixed forms. For the purposes of the present invention, polyolefin, polystyrene, ABS resin, polyester, and polyester-ABS alloy are preferred.

The polyolefin mentioned above means any of polyolefins, ethylene-vinyl ester copolymers, ethylene-acrylate copolymers, etc. In particular, the use of polyolefins is preferred from the standpoint of compatibility with component (B).

More particularly, the polyolefin resin includes high-density polyethylene (HDPE), low-density polyethylene (LDPE), linear low-density polyethylene (LLDPE), polypropylene (PP), polybutene, poly-4-methyl-pentene-1, ethylene-α-olefin copolymers, ethylene-propylene (random and/or block) copolymer, etc. These polyolefin species can be used independently or in combination. Particularly preferred are high-density, low-density, and linear low-density polyethylenes, polypropylene, and a combination of polypropylene with an ethylene-propylene (random and/or block) copolymer, and the number-average molecular weight of the polyolefin resin is generally 5,000–500,000 and preferably 10,000–200,000.

The styrenic resin includes, as mentioned above, polystyrene (GPPS), ABS, and other styrene copolymers and polymer alloys.

There is no particular limitation on the kind of ABS resin that can be used. Thus, the ABS resin may for example be a polymer blend obtainable by blending NBR with AS resin or a graft copolymer obtainable by graft-polymerizing styrene and acrylonitrile to polybutadiene. Not only the general grade polymers but also high fluidity grade resins with melt indexes around 60 g/10 min., heat-resistant grade resins with heat resisting temperatures around 110° C., flame-retardant grade resins containing some or other flame retardant, and glass fiber (GF)-reinforced grade resin, etc. can be employed with advantage. As other copolymers, High Impact polystyrene (HIPS) resins obtainable by graft-copolymerizing rubber components such as polybutadiene, acrylonitrile-styrene copolymer (AS resin), acrylonitrile-acrylic rubber-styrene copolymer (AAS resin), etc. can be mentioned. Preferred are the above-mentioned ABS, GPPS, and HIPS.

The polymer alloy as the styrenic thermoplastic resin includes but is not limited to ABS/polycarbonate (PC), ABS/polyamide (PA), ABS/polyvinyl chloride, and ABS/polybutylene terephthalate (PBT). Among them, ABS/polycarbonate (PC) is preferred.

The polyester resin includes polybutylene terephthalate (PBT), polyethylene terephthalate (PET), a polyester type thermoplastic elastomer consisting of ester bonds, etc. can be mentioned. Preferred are PBT and a polyester type thermoplastic elastomer.

The polymer alloy between polyester resin and ABS resin includes but is not limited to PBT/ABS alloy and polycarbonate (PC)/ABS alloy.

Component (B)

Component (B) may be e linear cationic copolymer composed of 80–98 mol % of an ethylene unit of formula (1) and 2–20 mol % of a cationic unit of general formula (3) and having a weight-average molecular weight of 1,000–50,000. The arrangement of said units is not restricted.

Component (B) may also be a linear cationic copolymer composed of 79.9–97.9 mol % of an ethylene unit of formula (1), not more than 15 mol % of an acrylate unit of general formula (2), and 2–20 mol % of a cationic unit of general formula (3) and having a weight-average molecular weight of 1,000–50,000. The arrangement of said units may be regular or irregular.

The structure of the cationic copolymer (B) for use in the resin composition of the present invention is now described in further detail.

Referring to the cationic copolymer for use in the resin composition of the present invention, the ethylene unit of formula (1) accounts for 80–98 mol % of the copolymer molecule. If the proportion of the cationic copolymer is less than 80 mol %, the compatibility between the copolymer and the matrix resin is drastically decreased to make the extrusion of the resin composition difficult and the water resistance and mechanical properties of products molded from the composition are also considerably sacrificed. On the other hand, if the upper limit of 98 mol % is exceeded, no sufficient antistatic properties will be realized. From the standpoints of compatibility, physical characteristics, and antistatic properties, the proportion of said ethylene unit (1) is preferably within the range of 85.0–97.5 mol %.

Referring, further, to the cationic copolymer for use in the resin composition of the present invention, the cationic unit of general formula (3) is a quaternized cationic acrylate or acrylamide unit and accounts for 2–20 mol % of the copolymer molecule. If its proportion of this unit is less than 2 mol %, the resin composition will not be sufficiently antistatic. If the proportion exceeds 20 mol %, the compatibility of the cationic copolymer with the matrix resin will be decreased so that not only the extrusion of the composition becomes difficult but the water resistance and mechanical properties of products are adversely affected. From the standpoints of antistatic properties, compatibility, and physical properties, the cationic acrylamide unit is preferred and its proportion is preferably 2.5–15 mol %.

Referring to general formula (3) representing said cationic unit, Z represents —COO— or —CONH— and $R^2$ represents ethylene or propylene. Both the ethylene and propylene groups may occur within one and the same molecule. $R^3$ and $R^4$ independently represent methyl, and from the standpoint of ease of production and antistatic performance, $R^5$ is preferably a linear lower alkyl group, e.g. methyl or ethyl, or an aralkyl group such as benzyl. X represents halogen (e.g. Cl, Br or I), $CH_3OSO_3$, $CH_3CH_2OSO_3$, or $R^6SO_3$, where $R^6$ represents $C_{1-8}$ alkyl or aralkyl.

Referring, further, to the carbonic copolymer for use in another resin composition embodying the present invention, the acrylate unit of general formula (2) accounts for not more than 15 mol % of the copolymer molecule. The presence of this acrylate unit (2) is conducive to improved compatibility between the cationic copolymer and the matrix resin. If the proportion of acrylate unit (2) exceeds 15 mol %, the physical properties of the resin composition will be adversely affected. From compatibility points of view, the proportion of acrylate unit (2) is preferably 0.1–13 mol % and, for still better results, about 3–13 mol %.

In the general formula (2) representing said acrylate unit, $R^1$ represents methyl or ethyl and may be the same or different groups over plural occurrences within the molecule.

Referring to the cationic copolymer containing not more than 15 mol % of acrylate unit (2), said ethylene unit (1) accounts for 79.9–97.9 mol % of the molecule. If the proportion of (1) is less than 79.9 mol %, the compatibility of the copolymer with the matrix resin will be considerably decreased so that not only the extrusion of the resin composition becomes difficult but the water resistance and mechanical properties of products molded from the composition are considerably sacrificed. If the proportion of ethylene unit (1) exceeds 97.9 mol %, no sufficient antistatic properties will be realized. From the standpoints of compatibility, physical properties, and antistatic properties, the proportion of ethylene unit (1) is preferably within the range of 82–94.5 mol %. The cationic unit (3) accounts for 2–20 mol % of the copolymer molecule. If this proportion is less than 2 mol %, the antistatic properties of the resin composition will not be sufficient. If the upper limit of 20 mol % is exceeded, the compatibility of the cationic copolymer with the matrix resin will deteriorate so that not only the extrusion of the resin composition becomes difficult but the water resistance and mechanical properties of products molded from the composition will be adversely affected. From the standpoints of antistatic properties, compatibility, and physical properties, the proportion of cationic unit (3) is preferably within the range of 2.5–15 mol %.

The weight-average molecular weight of said cationic copolymer can be determined by gel permeation chromatography. Thus, the polystyrene-equivalent weight-average molecular weight values mentioned herein are those determined by the ultrahigh-temperature GPC procedure [Kinukawa: Kobunshi Ronbunshu (Collection of Papers on High Polymers), vol. 44, No. 2, 139–141, 1987]. The range of weight-average molecular weight for the cationic copolymer is 1,000–50,000. If the weight-average molecular weight of the cationic copolymer is less than 1,000, the copolymer will be wax-like in consistency so that it may not be easily handled and the resultant excessive bleeding will lead to an excessive tackiness of the resin surface. If the weight-average molecular weight exceeds 50,000, the compatibility of the copolymer with the matrix resin will be poor. The preferred weight-average molecular weight of the cationic copolymer is 3,000–30,000.

The cationic copolymer for use in the resin composition of the present invention can be produced typically as follows. An ethylene-acrylate copolymer obtainable by copolymerizing ethylene with an acrylic acid ester by the high-pressure polymerization method is subjected to concurrent hydrolysis and thermal degradation to a desired molecular weight in the manner described in JP-A-60079008 and the resulting ethylene-acrylic acid copolymer or ethylene-acrylate-acrylic acid copolymer is amidated or esterified with an N,N-dialkylaminoalkylamine or an N,N-dialkylaminoalkanol as the case may be. This amidation or esterification product is cationized with a known quaternizing agent and isolated to give the desired cationic copolymer.

In the resin composition of the present invention, the practically acceptable proportion of said cationic copolymer is 3–30 parts by weight relative to 100 parts by weight of component (A). If the proportion of the cationic copolymer is less than 3 parts by weight, the desired antistatic properties will hardly be obtained. Conversely, if the proportion exceeds 30 parts by weight, the mechanical properties, particularly impact strength, of the resin will be adversely affected. To strike a balance between the antistatic and mechanical properties of the resin, the proportion of the cationic copolymer is preferably within the range of 3–20 parts by weight.

When a styrenic thermoplastic resin is used as Component (A) and a herein-defined copolymer as Component (C), the proportion of said component (B) can be decreased. Thus, when a styrenic thermoplastic resin is used as Component (A), the practical proportion of cationic copolymer (B) is 1–15 parts by weight based on 100 parts by weight of Component (A). If this proportion is less than 1 part by weight, the necessary antistatic properties will not be easily obtained. Conversely if it exceeds 15 parts by weight, it is not only uneconomical but may detract from the mechanical properties (especially impact strength) of the resin.

Within the range not detrimental to the heat resistance, antistatic properties and impact resistance of the resin, Component (B) may contain structural units of the following formulas (6) and (7) within its molecule.

(6)

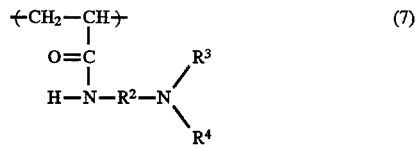
(7)

(wherein $R^2$, $R^3$, and $R^4$ are as defined hereinbefore)

Component (C)

Component (C) is a copolymer comprising at least one unit each per molecule of the structural unit represented by formula (4) and the structural unit represented by formula (5).

The monomer giving the unit of formula (4) includes ethylene, propylene, 1-butene, 1-octene, isoprene, $C_{12-42}$ olefins, styrene, methyl (meth)acrylate, ethyl (meth) acrylate, propyl (meth) acrylate, butyl (meth)acrylate, etc.

Where Component (A) is a polyolefin resin, the preferred monomer for providing the structure of formula (4) includes α-olefins such as ethylene, propylene, 1-butene, etc. and isoprene.

Where Component (A) is a styrenic resin such as ABS or polystyrene, the preferred monomer for providing the structure of formula (4) includes styrene and α-olefins (1–42 carbon atoms).

Where Component (A) is (meth)acrylic resin, the preferred monomer for providing the structure of formula (4) includes (meth)acrylic esters of 1–4 carbon atoms.

Among specific examples of the structure represented by formula (5) are succinic anhydride, succinimide, alkylsuccinimide, arylsuccinimide, dialkylaminoalkylsuccinimide, and trialkylammoniumalkylsuccinimide structures. Preferred are the succinic anhydride, alkylsuccinimide (particularly, $C_{4-12}$ alkyl-), arylsuccinimide, dialkylaminoalkylsuccinimide, and trialkylammoniumalkylsuccinimide structures.

If there is only less than one unit of the structure of formula (5) per molecule, the desired uniform distribution of surface resistivity (antistatic properties) will not be attained. Furthermore, it will be impossible to realize the advantage of providing sufficient antistatic properties with a reduced amount of a permanent antistatic agent in cases where a styrenic resin as Component (A) is used in combination with a herein-specified copolymer as Component (C).

The weight-average molecular weight of Component (C) is 800–200,000, but in consideration of compatibility with Component (A) and Component (B), it is preferably in the range of 800–20,000.

The proportion of Component (C) is 0.1–10 parts by weight based on 100 parts by weight of Component (A). If the proportion of Component (C) is less than 0.1 part by weight, no uniform distribution of surface resistivity will be obtained. If the upper limit of 10 parts by weight is exceeded, the mechanical properties, particularly impact strength, of the thermoplastic resin composition will be adversely affected. The proportion of Component (C) is preferably 0.2–7 parts by weight and, for still better results, 0.5–5 parts by weight.

In the embodiment where a styrenic thermoplastic resin as Component (A) is used in combination with a herein-specified copolymer as Component (C), the proportion of Component (C) can be reduced as it is the case with Component (B). The proportion of Component (C) in such a case is 0.05–5.0 parts by weight based on 100 parts by weight of Component (A). If the proportion is less than 0.05 part by weight, no substantial effect of addition will be realized. If the limit of 5.0 parts by weight is exceeded, the mechanical properties will tend to be poor. The proportion of Component (C) is preferably 0.1–3 parts by weight and, for still better results, 0.1–2.0 parts by weight.

By adding Component (C), not only a product with a uniform distribution of surface resistivity can be obtained but also a more finer dispersion of Component (B) in the matrix resin, i.e. Component (A), can be insured. Furthermore, addition of Component (C) provides for the effect of dispersing the permanent antistatic agent in streaks in the surface layer of the product in the molding stage. Therefore, compared with the case in which Component (C) is not added, the required amount of the antistatic component (B) for attaining a given level (or a higher level) of antistatic performance (surface resistivity) can be decreased as a secondary effect.

There is no particular limitation on the method for production of Component (C). For example, by grafting maleic anhydride to a polymer containing the recurring unit of formula (4) with the aid of a known peroxide or initiator or by copolymerizing a monomer of the structure of formula (4) with maleic anhydride, the succinic anhydride unit can be introduced. By causing an amine to react with the introduced succinic anhydride unit, the corresponding imide unit can be generated. For example, by reacting a primary alkylamine, the corresponding alkylsuccinimide structure can be obtained, while the use of an aromatic primary amine gives the corresponding arylsuccinimide structure.

As specific examples of Component (C), there can be mentioned propylene-maleic anhydride copolymer (Umex 1001 and Umex 1010, manufactured by Sanyo Chemical Industries, Ltd.), ethylene-maleic anhydride copolymer (Umex 2000, Sanyo Chemical Industries, Ltd.), α-olefin-maleic anhydride copolymer (Dia Carna PA124, PA168, PA208, PA30, Mitsubishi Chemical), and isobutylene-maleic anhydride copolymer (Isobam 10, Isobam 06, Isobam 04, etc., Kuraray Co., Ltd.), among others.

As uses for the resin composition of the present invention, there can be mentioned packaging materials for electronic parts (IC tray, magazine rail, carrier tape, etc.), OA equipment (housings, copy or FAX paper trays, etc.), and sundry products (packaging materials, containers, combs, etc.).

There is no particular limitation on the method for production of the resin composition of the present invention. For example, the composition can be obtained by mixing Components (A), (B), and (C) in the specified proportions and feeding the mixture to a biaxial or mono-axial extruder or by feeding each component to the extruder via a quantitative feeder such as a screw feeder. It is also possible to manufacture the composition by means of a pressure kneader, Bumbery mixer or other machine.

In the present invention, there can be incorporated a variety of other additives, for example inorganic fillers such as calcium carbonate, talc, glass fiber, etc., phosphorus-containing heat stabilizers such as tetrakis(2,4-di-tert-butylphenyl)-4,4'-bi-phenylene diphosphonite etc., hindered phenols such as tetrakis [methylene-3-(3,5-di-tert-butyl-4-hydroxyphenyl) propionate]methane etc., S-containing antioxidants such as mercaptopropionic acid esters etc., bromine-containing flame retardants such as hexabromocyclododecane, tetrabromo-bisphenol A and its derivatives, diphenyl ether bromides, etc., p-containing flame retardants, auxiliary flame retardants such as $Sb_2O_3$, nonionic, anionic or cationic surfactants, polyoxyethylene chain-containing polymer antistatic agents such as the polymers obtainable by polycondensing polyoxyethylene or polyethylene glycol in the manner of ester bonding, amide bonding or imide bonding or the polymers obtainable by the poly-addition reaction of polyoxyethylene or polyethylene glycol by way of urethane bonding, epoxy ester bonding or epoxy ether bonding.

The conventional internal antistatic agent bleeds out to form a hygroscopic layer on the resin surface and, hence, causes a leakage of static electricity. In the resin composition of the present invention, the cationic copolymer added forms a continuous layer near the surface layer of the matrix resin and a leakage of static electricity occurs due to the movement of electric charge accompanying the movement of paired ions of the cationic groups present in the copolymer. Therefore, the rate of charge leakage in the resin composition of the present invention is faster than the rate of leakage in the composition containing the conventional internal antistatic agent.

Moreover, since it is not that an antistatic agent is merely attached to the resin surface of the product, the antistatic component is not detached by surface friction or washing, with the result that the imparted antistatic effect is sustained.

Furthermore, as Component (C) having a herein-specified structure contributes to a uniform and fine dispersion of cationic copolymer (B) in matrix resin (A), the distribution of antistatic property (surface resistivity) becomes uniform.

Examples of synthesis of the cationic copolymer [Component (B)] are now presented in the first place.

Example of Synthesis-a

A 1-L four-necked flask equipped with a thermometer, stirrer, drip funnel, and Dean-Stark trap was charged with 400 ml of xylene, 150 g of ethylene-ethyl acrylate-acrylic acid copolymer (ethylene:ethyl acryl ate:acrylic acid= 93:3:4, mol %), and 1.0 g of p-toluenesulfonic acid.

Then, 21.1 g of N,N-dimethylaminopropylamine was added and the mixture was heated on an oil bath at 140° C. with the byproduct water being removed azeotropically with xylene. The amidation reaction was continued at 140° C. for 17 hours until the azeotropic distillation of water had ended.

This reaction mixture, 458 g, was allowed to cool to 80° C., and from the drip funnel, 31.1 g of diethyl sulfate was added gradually dropwise over 1 hour. Though heat was evolved during dropwise addition, the reaction temperature was maintained at 90° C. by cooling and after completion of dropwise addition, the reaction mixture was allowed to age at 100° C. for 4 hours. The reaction mixture thus obtained was poured in a large quantity of methanol and the precipitate was recovered and dried to provide an acrylamide copolymer (a). The weight-average molecular weight of this polymer (a) was found to be 5,300.

Example of Synthesis-b

A 1-L four-necked flask equipped with a thermometer, stirrer, drip funnel, and Dean-Stark trap was charged with 400 ml of xylene, 150 g of ethylene-acrylic acid copolymer (ethylene:acrylic acid=91:9, mol %), and 1.0 g of p-toluenesulfonic acid.

Then, the flask was further charged with 38.5 g of N,N-dimethylaminoethylamine and heated on an oil bath at 140° C., with the byproduct water being removed azeotropically with xylene. This amidation reaction was conducted at 140° C. for 17 hours or until the azeotropic distillation of water had ended.

This reaction mixture was allowed to cool to 80° C. and 72.0 g of methyl iodide was added dropwise over 1 hour. Though heat was evolved during this procedure, the reaction temperature was maintained at 90° C. by cooling and after completion of the dropwise addition, the reaction mixture was allowed to age at 100° C. for 4 hours.

The reaction mixture thus obtained was poured in a large quantity of n-hexane and the precipitate was recovered and dried to provide an acrylamide copolymer (b). The weight-average molecular weight of this polymer (b) was found to be 22,000.

Example of Synthesis-c

A 1-L four-necked flask equipped with a thermometer, stirrer, drip funnel, and Dean-Stark trap was charged with 400 ml of xylene and 150 g (the equivalent of 0.315 mol carboxyl groups) of ethylene-ethyl acrylate-acrylic acid copolymer (ethylene:ethyl acrylate:acrylic acid=90:3:7, mol %) and heated at 100° C. to prepare a homogeneous solution.

Then, the flask was further charged with 30.6 g (0.299 mol) of N,N-dimethylaminopropylamine and heated at 140° C., with the byproduct water being removed azeotropically with xylene. The amidation reaction was conducted at 140°

C. for 20 hours or until the azeotropic distillation of water had ended. This reaction mixture was allowed to cool to 80° C. and poured in 5 volumes of methanol. The precipitate was further washed with methanol and dried in vacuo to provide an intermediate copolymer. The quantity of tertiary amino groups introduced into this intermediate polymer as determined by neutralization titrimetry was 1.71 meq/g.

Then, 150 g of the above intermediate polymer was re-dissolved in xylene and from the drip funnel, 28.3 g of methyl methanesulfonate was added dropwise over 1 hour. Though heat was evolved during this procedure, the reaction temperature was maintained at 110° C. by cooling. After completion of dropwise addition, the reaction mixture was further allowed to age at 120° C. for 3 hours, whereby the tertiary amino groups were converted to quaternary ammonium groups. This reaction mixture was poured in methanol and the resulting precipitate was further washed with methanol and dried in vacuo to provide 175 g of an acrylamide cationized copolymer (c). The weight-average molecular weight of this polymer (c) was found to be 30,000.

Example of Synthesis-d

Using the same equipment, starting resin and method as those described in Example of Synthesis-a but using N,N-dimethylaminoethanol as the amine, a cationic copolymer (d) was synthesized. The weight-average molecular weight of this polymer (d) was found to be 5,300.

Examples of synthesis of component (C) are now described.

Example of Synthesis-1

A 1-L four-necked flask equipped with a thermometer, stirrer, drip funnel, and Dean-Stark trap was charged with 400 ml of xylene and 150 g of styrenemaleic anhydride copolymer (3:1, by mol) (SMA 3000, Elf-Atochem). Then, the flask was further charged with 41.1 g of N,N-dimethylaminopropylamine and the reaction was carried out on an oil bath at 140° C., with the byproduct water being continuously removed azeotropically with xylene, until the azeotropic distillation of water had ended.

This reaction mixture was cooled to 50° C. and poured in isobutyl alcohol and the resulting precipitate was recovered and dried to provide a copolymer. The weight-average molecular weight of this polymer was found to be 2,200.

Examples of Synthesis-2 and 3

Using the same styrene-maleic anhydride copolymer as used in Example of Synthesis-1 and the compounds shown in Table 1 as the amine, copolymers were synthesized (Example of Synthesis-2 and Example of Synthesis-3) under otherwise the same conditions as in Example of Synthesis-1.

Examples of Synthesis-4 and 5

A 1-L four-necked flask equipped with a thermometer, stirrer, drip funnel, and Dean-Stark trap was charged with 400 ml of xylene and 100 g of the copolymer obtained in Example of Synthesis-1 and heated to 90° C. to prepare a solution. To this solution was added 62 g of diethyl sulfate gradually dropwise. Though the reaction was accompanied by evolution of heat, the reaction temperature was controlled at 90°–110° C. by cooling. After completion of the dropwise addition of diethyl sulfate, the reaction mixture was allowed to age at the same temperature for 4 hours. This reaction mixture was cooled to 80° C. or below and poured in n-hexane, and the resulting precipitate was recovered and dried to provide a copolymer (Example of Synthesis-4).

Using methyl iodide in lieu of diethyl sulfate, the above procedure was otherwise repeated to provide a copolymer (Example of Synthesis-5).

TABLE 1

| Example of Synthesis No. | Starting Resin | Amine/Quaternizing agent | Y in formula (5) | $\bar{M}w$ |
|---|---|---|---|---|
| 1 | Styrene-maleic anhydride copolymer | N,N-dimethylaminopropylamine | 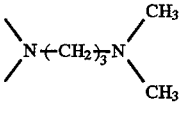 | 2200 |
| 2 | Styrene-maleic anhydride copolymer | Stearylamine | 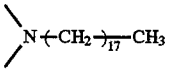 | 2200 |
| 3 | Styrene-maleic anhydride copolymer | Aniline | 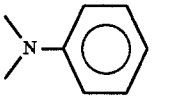 | 2200 |
| 4 | Styrene-maleic anhydride copolymer | N,N-dimethylaminopropylamine/ diethyl sulfate | 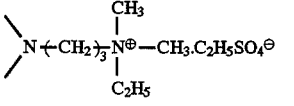 | 2200 |
| 5 | Styrene-maleic anhydride copolymer | N,N-dimethylaminopropylamine/ methyl iodide | 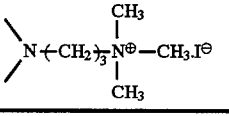 | 2200 |

Example of Synthesis-6

In accordance with the procedure for production of a maleic anhydride-grafted polypropylene (JP-B-56009925), 100 parts by weight of crystalline polypropylene powder, 12 parts by weight of maleic anhydride, and 4 parts by weight of dicumyl peroxide were premixed and extruded by means of an extruder having a screw geometry of diameter=30 mm and L/D=28 at a barrel temperature of 230° C. and a screw speed of 60 rpm. The extruded graft polymer was crushed, immersed in acetone to extract off the unreacted maleic anhydride, and dried to provide a maleic anhydride-grafted polypropylene. The graft rate of maleic anhydride was 4.3 weight %.

Examples of Synthesis-7 through 9

Using the maleic anhydride-grafted polypropylene obtained in Example of Synthesis-6 and the amines shown in Table 2, copolymers (Example of Synthesis-7 through Example of Synthesis-9) were prepared under otherwise the same conditions as those used in Example of Synthesis-1.

Examples of Synthesis-10 through 12

Using an α-olefin-maleic anhydride copolymer (Dia Carna PA168, Mitsubishi Chemical) and the amines shown in Table 2, copolymers (Example of Synthesis-10 through Example of Synthesis-12) were prepared under otherwise the same conditions as used in Example of Synthesis-1.

TABLE 2

| Example of Synthesis No. | Starting Resin | Amine/Quaternizing agent | Y in formula (5) | $\bar{M}_w$ |
|---|---|---|---|---|
| 7 | Maleic anhydride-grafted polypropylene | Laurylamine | 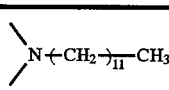 | 160000 |
| 8 | Maleic anhydride-grafted polypropylene | Benzylamine | 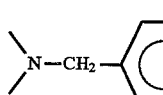 | 160000 |
| 9 | Maleic anhydride-grafted polypropylene | N,N-dimethylaminoethylamine | 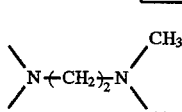 | 160000 |
| 10 | α-olefin-maleic anhydride copolymer | N,N-dimethylaminoneopenthylamine | 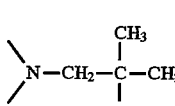 | 17000 |
| 11 | α-olefin-maleic anhydride copolymer | Cyclohexylamine | 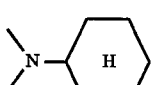 | 17000 |
| 12 | α-olefin-maleic anhydride copolymer | Stearylamine | 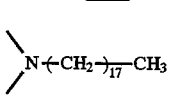 | 17000 |

Some specific examples of the resin composition of the present invention and the corresponding comparative examples as references are now described below. While the components (A) and (C) used are indicated by abbreviations in Tables 4 and 5, the particulars are as shown in Table 3.

TABLE 3

| | |
|---|---|
| HDPE | High-density polyethylene |
| | (Mitsubishi Chemical, Mitsubishi Polyethy HD JV070S) |
| LDPE | Low-density polyethylene |
| | (Mitsubishi Chemical, Mitsubishi Polyethy LD M420) |
| PP | Polypropylene |
| | (Tokuyama, Tokuyama Polypro ME230) |
| L-LDPE | Linear low-density polyethylene |
| | (Mitsubishi Chemical, Mitsubishi Polyethy LL UP440) |
| HIPS | Impact-resistant polystyrene |
| | (Nippon Steel Chemical, Esthylene H-65) |
| ABS | ABS resin (Japan Synthetic Rubber, JSR ABS35) |
| ABS/PA | ABS/polyamide alloy |
| | (Japan Synthetic Rubber, JSR Masqulloy AK101) |
| ABS/PC | ABS/polycarbonate alloy |
| | (Sumitomo-Dow, Techni-Ace T-210) |
| ABS/PBT | ABS/polybutylene terephthalate alloy |
| | (Japan Synthetic Rubber, JSR Masqulloy BK102) |
| MMA | Acrylic resin (Mitsubishi Rayon, Acrypet mD) |
| PA 6,6 | Polyamide 6,6 (Asahi Chemical Industry, Leona 1300S) |
| PBT | Polybutylene terephthalate |
| | (Toray Industries, Tbray PBT1401) |
| Copolymer 1 | Styrene-maleic anhydride copolymer |
| (Mw = 1900) | (Elf-Atochem, SMA-3000) |
| Copolymer 2 | α-olefin($C_{30-36}$)-maleic anhydride copolymer |
| (Mw = 9000) | (Mitsubishi Chemical, Dia Carna PA30) |
| Copolymer 3 | Propylene-maleic anhydride copolymer |
| (Mw = 15000) | (Sanyo Chemical Industries, Umex 1001) |
| Copolymer 4 | Ethylene-maleic anhydride copolymer |
| (Mw = 3000) | (Sanyo Chemical Industries, Umex 2000) |
| Copolymer 5 | α-Olefin($C_{14}$)-maleic anhydride copolymer |
| (Mw = 13000) | (Mitsubishi Chemical, Dia Carna PA-124) |
| Copolymer 6 | Isobutylene-maleic anhydride copolymer |
| (Mw = 60000) | (Kuraray, Isobam 04) |

Examples 1 through 17 and Comparative Examples 1 through 17

1. Production of Resin Compositions

Various thermoplastic resins [Component (A)] and the cationic copolymers [Component (B)] and copolymers [Component (C)] obtained in Examples of Synthesis were kneaded in the combinations indicated in Tables 4 and 5 and extruded with a biaxial extruder (KRC Kneader S-II, Kurimoto Ltd.) equipped with a quantitative feeder at 230° C. (provided, however, that ABS/PA, ABS/PC, and PA were kneaded and injection-molded at 250° C.) and cut cold to provide pelletized compositions. Each of these pelletized compositions was injection-molded with an injection machine (Hypershot 3000, Niigata Engineering Co., Ltd.) to prepare testpieces and these testpieces were subjected to the following tests. As comparative examples, the Component C-free compositions shown in Table 5 were produced and molded to prepare testpieces in the same manner as above and the testpieces were subjected to the same tests.

2. Methods for Testing the Electrical and Physical Properties of Resin Compositions

[1] Electrical Characteristics

The testpiece was conditioned in an environment of 20° C. and 60% R.H. for at least 24 hours and then tested for electrical characteristics.

(1) Surface Resistivity and the Uniformity of its Distribution

The injection-molded testpiece sized 300 mmL×300 mmW×3 mmT was divided into 9 sections as illustrated in FIG. 1 and the surface resistivity of each section was measured with an ultra-insulation resistance meter (R-8340, Advantest) at an application voltage of 500 V.

(2) Charge Attenuation Rate

Using a static honestmeter (Shishido Shokai) and section (A) of the testpiece shown in FIG. 1, a voltage of 100,000 V was applied for 30 seconds and the time till attenuation to one-half of the initial voltage was measured and expressed in seconds.

[2] Mechanical Characteristics (1) Izod Impact Strength

The Izod impact strength of the testpiece was measured in accordance with JIS K-7110.

(2) Heat Resistance

The thermal deformation temperature was determined in accordance with JIS K-7207. Except that Method B was used for the testpieces according to Example 16 and Comparative Example 16, Method A was used for all other testpieces.

(3) Crosshatch test

A 10 mm×10 mm area of the testpiece was cross-hatched at 1 mm pitches to prepare 100 squares each measuring 1 $mm^2$. A Cello Tape was applied to the crosshatched area and then peeled off with a strong force and the squares not peeled off without adherence to the tape were counted.

o: No square detached.

Δ: 1–50 squares detached.

x: 50–100 squares detached.

The larger the number of squares not detached is, the greater is the homogeneity of the resin composition.

The results of characteristic tests are shown in Table 6 [Examples] and table 7 [Comparative Examples].

TABLE 4

| Example No. | Thermoplastic Resin (Component(A)) | (parts by) (weight) | Cationic Copolymer (Component(B)) | (parts by) (weight) | Copolymer (Component(C)) | (parts by) (weight) |
|---|---|---|---|---|---|---|
| 1 | HDPE | (100) | Example of Synthesis-a | (10) | Example of Synthesis-9 | (3) |
| 2 | LDPE | (100) | Example of Synthesis-b | (10) | Example of Synthesis-6 | (3) |
| 3 | PP | (100) | Example of Synthesis-c | (10) | Example of Synthesis-7 | (3) |
| 4 | PP | (100) | Example of Synthesis-d | (10) | Copolymer 2 | (3) |
| 5 | L-LDPE | (100) | Example of Synthesis-a | (10) | Example of Synthesis-12 | (3) |
| 6 | HDPE | (100) | Example of Synthesis-c | (10) | Example of Synthesis-10 | (3) |
| 7 | HIPS | (100) | Example of Synthesis-a | (10) | Example of Synthesis-4 | (3) |
| 8 | HIPS | (100) | Example of Synthesis-c | (10) | Example of Synthesis-1 | (3) |
| 9 | ABS | (100) | Example of Synthesis-c | (10) | Example of Synthesis-5 | (3) |
| 10 | ABS | (100) | Example of Synthesis-b | (10) | Example of Synthesis-2 | (3) |
| 11 | ABS/PA | (100) | Example of Synthesis-c | (10) | Copolymer 1 | (3) |
| 12 | ABS/PC | (100) | Example of Synthesis-c | (10) | Example of Synthesis-3 | (3) |
| 13 | ABS/PBT | (100) | Example of Synthesis-c | (10) | Example of Synthesis-3 | (3) |
| 14 | ABS/PA | (100) | Example of Synthesis-c | (10) | Example of Synthesis-2 | (3) |
| 15 | MMA | (100) | Example of Synthesis-a | (10) | Example of Synthesis-11 | (3) |
| 16 | PA6, 6 | (100) | Example of Synthesis-c | (10) | Example of Synthesis-8 | (3) |
| 17 | PBT | (100) | Example of Synthesis-c | (10) | Example of Synthesis-3 | (3) |

TABLE 5

| Example No. | Thermoplastic Resin (Component(A)) | (parts by) (weight) | Cationic Copolymer (Component(B)) | (parts by) (weight) | Copolymer (Component(C)) | (parts by) (weight) |
|---|---|---|---|---|---|---|
| 1 | HDPE | (100) | Example of Synthesis-a | (10) | — | |
| 2 | LDPE | (100) | Example of Synthesis-b | (10) | — | |
| 3 | PP | (100) | Example of Synthesis-c | (10) | — | |
| 4 | PP | (100) | Example of Synthesis-d | (10) | — | |
| 5 | L-LDPE | (100) | Example of Synthesis-a | (10) | — | |
| 6 | HDPE | (100) | Example of Synthesis-c | (10) | — | |
| 7 | HIPS | (100) | Example of Synthesis-a | (10) | — | |
| 8 | HIPS | (100) | Example of Synthesis-c | (10) | — | |
| 9 | ABS | (100) | Example of Synthesis-c | (10) | — | |
| 10 | ABS | (100) | Example of Synthesis-b | (10) | — | |
| 11 | ABS/PA | (100) | Example of Synthesis-c | (10) | — | |
| 12 | ABS/PC | (100) | Example of Synthesis-c | (10) | — | |
| 13 | ABS/PBT | (100) | Example of Synthesis-c | (10) | — | |
| 14 | ABS/PA | (100) | Example of Synthesis-c | (10) | — | |

TABLE 5-continued

| Example No. | Thermoplastic Resin (Component(A)) | (parts by) (weight) | Cationic Copolymer (Component(B)) | (parts by) (weight) | Copolymer (Component(C)) | (parts by) (weight) |
|---|---|---|---|---|---|---|
| 15 | MMA | (100) | Example of Synthesis-a | (10) | — | |
| 16 | PA6, 6 | (100) | Example of Synthesis-c | (10) | — | |
| 17 | PBT | (100) | Example of Synthesis-c | (10) | — | |

TABLE 6

| Example No. | Surface Resistivity ($\Omega$) | | | | | | |
|---|---|---|---|---|---|---|---|
| | A | B | C | D | E | F | G |
| 1 | $4.33 \times 10^{11}$ | $3.91 \times 10^{10}$ | $4.23 \times 10^{11}$ | $4.01 \times 10^{10}$ | $2.82 \times 10^{10}$ | $4.82 \times 10^{10}$ | $3.49 \times 10^{10}$ |
| 2 | $5.55 \times 10^{11}$ | $2.34 \times 10^{10}$ | $4.48 \times 10^{11}$ | $4.35 \times 10^{11}$ | $2.73 \times 10^{10}$ | $4.90 \times 10^{10}$ | $5.76 \times 10^{10}$ |
| 3 | $9.53 \times 10^{11}$ | $6.61 \times 10^{11}$ | $7.60 \times 10^{11}$ | $6.89 \times 10^{10}$ | $6.70 \times 10^{10}$ | $8.02 \times 10^{10}$ | $5.33 \times 10^{10}$ |
| 4 | $4.58 \times 10^{12}$ | $1.90 \times 10^{12}$ | $3.14 \times 10^{12}$ | $1.84 \times 10^{12}$ | $2.05 \times 10^{12}$ | $1.90 \times 10^{11}$ | $4.85 \times 10^{11}$ |
| 5 | $3.76 \times 10^{12}$ | $2.43 \times 10^{12}$ | $4.76 \times 10^{12}$ | $4.10 \times 10^{11}$ | $2.21 \times 10^{11}$ | $3.23 \times 10^{11}$ | $1.56 \times 10^{11}$ |
| 6 | $3.93 \times 10^{11}$ | $3.42 \times 10^{10}$ | $3.54 \times 10^{11}$ | $4.70 \times 10^{10}$ | $1.47 \times 10^{10}$ | $3.77 \times 10^{10}$ | $2.78 \times 10^{10}$ |
| 7 | $6.53 \times 10^{11}$ | $4.59 \times 10^{10}$ | $4.56 \times 10^{11}$ | $5.91 \times 10^{10}$ | $6.51 \times 10^{10}$ | $4.99 \times 10^{10}$ | $6.18 \times 10^{10}$ |
| 8 | $8.05 \times 10^{10}$ | $6.61 \times 10^{10}$ | $5.75 \times 10^{10}$ | $5.97 \times 10^{9}$ | $4.71 \times 10^{9}$ | $5.44 \times 10^{9}$ | $6.16 \times 10^{9}$ |
| 9 | $8.12 \times 10^{12}$ | $7.70 \times 10^{11}$ | $6.05 \times 10^{12}$ | $6.92 \times 10^{11}$ | $6.89 \times 10^{11}$ | $6.45 \times 10^{11}$ | $8.55 \times 10^{11}$ |
| 10 | $5.37 \times 10^{11}$ | $4.35 \times 10^{11}$ | $3.26 \times 10^{11}$ | $4.04 \times 10^{10}$ | $5.27 \times 10^{10}$ | $4.96 \times 10^{10}$ | $5.62 \times 10^{10}$ |
| 11 | $8.08 \times 10^{12}$ | $7.89 \times 10^{11}$ | $7.33 \times 10^{12}$ | $7.50 \times 10^{11}$ | $5.88 \times 10^{11}$ | $6.20 \times 10^{11}$ | $5.87 \times 10^{11}$ |
| 12 | $3.23 \times 10^{12}$ | $2.73 \times 10^{11}$ | $3.12 \times 10^{11}$ | $2.05 \times 10^{11}$ | $2.98 \times 10^{11}$ | $3.37 \times 10^{11}$ | $3.84 \times 10^{11}$ |
| 13 | $2.44 \times 10^{12}$ | $4.49 \times 10^{11}$ | $4.44 \times 10^{12}$ | $3.32 \times 10^{12}$ | $4.43 \times 10^{11}$ | $3.15 \times 10^{11}$ | $2.81 \times 10^{11}$ |
| 14 | $3.62 \times 10^{12}$ | $4.89 \times 10^{11}$ | $4.60 \times 10^{12}$ | $5.11 \times 10^{11}$ | $2.23 \times 10^{11}$ | $3.47 \times 10^{11}$ | $4.41 \times 10^{11}$ |
| 15 | $8.32 \times 10^{11}$ | $6.16 \times 10^{10}$ | $7.52 \times 10^{11}$ | $6.78 \times 10^{10}$ | $8.01 \times 10^{10}$ | $8.71 \times 10^{11}$ | $7.86 \times 10^{10}$ |
| 16 | $1.30 \times 10^{11}$ | $1.04 \times 10^{10}$ | $1.36 \times 10^{11}$ | $1.89 \times 10^{10}$ | $1.33 \times 10^{10}$ | $3.31 \times 10^{10}$ | $2.71 \times 10^{10}$ |
| 17 | $9.68 \times 10^{12}$ | $7.81 \times 10^{11}$ | $6.12 \times 10^{12}$ | $6.27 \times 10^{11}$ | $5.26 \times 10^{11}$ | $5.64 \times 10^{11}$ | $8.50 \times 10^{11}$ |

| Example No. | Surface Resistivity ($\Omega$) | | Charge Attenuation Rate(s) | Izod Impact Strength | Heat Resistance | Cross-hatch Test |
|---|---|---|---|---|---|---|
| | H | I | | | | |
| 1 | $3.27 \times 10^{10}$ | $4.72 \times 10^{10}$ | 0.7 | 28.1 | 76.8 | ○ |
| 2 | $1.19 \times 10^{10}$ | $4.55 \times 10^{10}$ | 0.6 | — | — | ○ |
| 3 | $5.94 \times 10^{10}$ | $4.78 \times 10^{10}$ | 0.6 | 3.1 | 128.7 | ○ |
| 4 | $1.94 \times 10^{11}$ | $2.87 \times 10^{11}$ | 1.8 | 3.0 | 129.2 | ○ |
| 5 | $1.98 \times 10^{11}$ | $2.26 \times 10^{11}$ | 1.6 | — | — | ○ |
| 6 | $1.08 \times 10^{10}$ | $1.40 \times 10^{10}$ | 0.6 | 30.3 | 76.9 | ○ |
| 7 | $1.98 \times 10^{10}$ | $3.67 \times 10^{10}$ | 0.6 | 7.8 | 83.8 | ○ |
| 8 | $4.08 \times 10^{9}$ | $5.56 \times 10^{9}$ | 0.6 | 8.1 | 83.3 | ○ |
| 9 | $5.79 \times 10^{11}$ | $6.28 \times 10^{11}$ | 1.7 | 21.7 | 87.4 | ○ |
| 10 | $6.58 \times 10^{10}$ | $4.46 \times 10^{10}$ | 0.6 | 22.5 | 86.1 | ○ |
| 11 | $6.42 \times 10^{11}$ | $5.65 \times 10^{11}$ | 1.1 | 12.2 | 90.7 | ○ |
| 12 | $2.23 \times 10^{11}$ | $2.10 \times 10^{11}$ | 0.9 | 38.6 | 103.8 | ○ |
| 13 | $1.40 \times 10^{11}$ | $2.47 \times 10^{11}$ | 1.6 | 29.2 | 88.8 | ○ |
| 14 | $2.97 \times 10^{11}$ | $3.79 \times 10^{11}$ | 1.2 | 11.4 | 91.0 | ○ |
| 15 | $8.05 \times 10^{10}$ | $7.08 \times 10^{10}$ | 0.6 | 1.3 | 87.2 | ○ |
| 16 | $2.26 \times 10^{10}$ | $2.93 \times 10^{10}$ | 0.6 | 4.3 | 227.4 | ○ |
| 17 | $8.78 \times 10^{11}$ | $7.72 \times 10^{11}$ | 1.5 | 4.2 | 58.2 | ○ |

TABLE 7

| Comparative Example No. | Surface Resistivity ($\Omega$) | | | | | | |
|---|---|---|---|---|---|---|---|
| | A | B | C | D | E | F | G |
| 1 | $7.23 \times 10^{13}$ | $4.34 \times 10^{12}$ | $3.14 \times 10^{13}$ | $8.15 \times 10^{12}$ | $3.50 \times 10^{10}$ | $7.69 \times 10^{11}$ | $7.00 \times 10^{10}$ |
| 2 | $6.77 \times 10^{14}$ | $9.00 \times 10^{13}$ | $6.62 \times 10^{14}$ | $9.84 \times 10^{12}$ | $4.60 \times 10^{10}$ | $6.80 \times 10^{11}$ | $6.63 \times 10^{11}$ |
| 3 | $7.10 \times 10^{13}$ | $8.14 \times 10^{13}$ | $1.37 \times 10^{13}$ | $5.89 \times 10^{12}$ | $6.79 \times 10^{10}$ | $9.01 \times 10^{12}$ | $1.73 \times 10^{11}$ |
| 4 | $2.22 \times 10^{15}$ | $3.33 \times 10^{14}$ | $5.00 \times 10^{14}$ | $6.29 \times 10^{13}$ | $3.12 \times 10^{11}$ | $6.35 \times 10^{12}$ | $8.64 \times 10^{11}$ |
| 5 | $1.76 \times 10^{14}$ | $8.30 \times 10^{13}$ | $5.39 \times 10^{14}$ | $5.96 \times 10^{12}$ | $6.20 \times 10^{11}$ | $8.32 \times 10^{11}$ | $2.00 \times 10^{11}$ |

TABLE 7-continued

| | | | | | | | |
|---|---|---|---|---|---|---|---|
| 6 | $8.28 \times 10^{14}$ | $7.37 \times 10^{13}$ | $2.76 \times 10^{13}$ | $1.99 \times 10^{12}$ | $7.66 \times 10^{11}$ | $8.00 \times 10^{12}$ | $4.01 \times 10^{10}$ |
| 7 | $9.55 \times 10^{15}$ | $4.72 \times 10^{14}$ | $1.87 \times 10^{14}$ | $4.55 \times 10^{13}$ | $8.36 \times 10^{12}$ | $5.00 \times 10^{13}$ | $8.97 \times 10^{11}$ |
| 8 | $3.24 \times 10^{14}$ | $5.50 \times 10^{13}$ | $9.76 \times 10^{13}$ | $3.76 \times 10^{11}$ | $4.04 \times 10^{9}$ | $1.63 \times 10^{11}$ | $4.45 \times 10^{10}$ |
| 9 | $2.22 \times 10^{15}$ | $4.39 \times 10^{14}$ | $1.71 \times 10^{15}$ | $6.42 \times 10^{14}$ | $8.57 \times 10^{12}$ | $6.18 \times 10^{13}$ | $3.78 \times 10^{11}$ |
| 10 | $1.77 \times 10^{13}$ | $6.24 \times 10^{12}$ | $5.70 \times 10^{13}$ | $9.10 \times 10^{11}$ | $3.95 \times 10^{11}$ | $1.14 \times 10^{11}$ | $6.79 \times 10^{11}$ |
| 11 | $9.36 \times 10^{14}$ | $3.00 \times 10^{13}$ | $9.74 \times 10^{14}$ | $2.90 \times 10^{13}$ | $3.71 \times 10^{12}$ | $4.21 \times 10^{13}$ | $4.70 \times 10^{12}$ |
| 12 | $5.80 \times 10^{13}$ | $1.26 \times 10^{13}$ | $8.78 \times 10^{14}$ | $5.90 \times 10^{12}$ | $5.66 \times 10^{12}$ | $1.59 \times 10^{12}$ | $2.97 \times 10^{11}$ |
| 13 | $3.16 \times 10^{14}$ | $3.18 \times 10^{14}$ | $3.26 \times 10^{14}$ | $9.48 \times 10^{13}$ | $3.46 \times 10^{11}$ | $3.87 \times 10^{12}$ | $5.15 \times 10^{10}$ |
| 14 | $1.11 \times 10^{13}$ | $1.05 \times 10^{13}$ | $8.64 \times 10^{13}$ | $4.79 \times 10^{11}$ | $9.68 \times 10^{11}$ | $2.50 \times 10^{12}$ | $3.07 \times 10^{11}$ |
| 15 | $4.60 \times 10^{14}$ | $1.48 \times 10^{13}$ | $3.56 \times 10^{14}$ | $1.44 \times 10^{12}$ | $1.06 \times 10^{11}$ | $4.90 \times 10^{13}$ | $5.02 \times 10^{11}$ |
| 16 | $8.70 \times 10^{13}$ | $8.84 \times 10^{13}$ | $5.00 \times 10^{13}$ | $7.30 \times 10^{12}$ | $9.79 \times 10^{12}$ | $1.21 \times 10^{12}$ | $7.09 \times 10^{11}$ |
| 17 | $8.87 \times 10^{14}$ | $5.24 \times 10^{13}$ | $5.72 \times 10^{13}$ | $6.08 \times 10^{13}$ | $9.59 \times 10^{12}$ | $5.43 \times 10^{12}$ | $6.50 \times 10^{11}$ |

| Example No. | Surface Resistivity ($\Omega$) | | Charge Attenuation Rate(s) | Izod Impact Strength | Heat Resistance | Crosshatch Test |
|---|---|---|---|---|---|---|
| | H | I | | | | |
| 1 | $1.08 \times 10^{10}$ | $4.32 \times 10^{11}$ | 2.3 | 12.8 | 74.2 | X |
| 2 | $8.67 \times 10^{9}$ | $9.29 \times 10^{11}$ | 3.2 | — | — | X |
| 3 | $1.34 \times 10^{10}$ | $9.54 \times 10^{11}$ | 3.3 | 0.8 | 125.3 | Δ |
| 4 | $1.03 \times 10^{11}$ | $2.08 \times 10^{12}$ | 4.0 | 0.6 | 123.7 | Δ |
| 5 | $7.91 \times 10^{10}$ | $3.69 \times 10^{12}$ | 3.1 | — | — | Δ |
| 6 | $6.17 \times 10^{9}$ | $6.51 \times 10^{10}$ | 3.0 | 10.6 | 75.3 | Δ |
| 7 | $2.15 \times 10^{10}$ | $3.58 \times 10^{11}$ | 5.1 | 2.1 | 82.9 | Δ |
| 8 | $1.80 \times 10^{9}$ | $6.97 \times 10^{9}$ | 2.7 | 1.7 | 81.7 | X |
| 9 | $3.68 \times 10^{11}$ | $7.05 \times 10^{12}$ | 5.9 | 3.1 | 85.7 | X |
| 10 | $4.96 \times 10^{10}$ | $7.76 \times 10^{11}$ | 2.1 | 2.7 | 85.5 | X |
| 11 | $6.51 \times 10^{11}$ | $3.01 \times 10^{11}$ | 5.1 | 1.6 | 87.6 | X |
| 12 | $8.64 \times 10^{10}$ | $9.67 \times 10^{11}$ | 3.2 | 7.1 | 100.3 | X |
| 13 | $4.87 \times 10^{10}$ | $9.20 \times 10^{11}$ | 4.3 | 5.4 | 86.4 | X |
| 14 | $1.11 \times 10^{11}$ | $8.13 \times 10^{12}$ | 2.4 | 1.7 | 90.3 | X |
| 15 | $3.14 \times 10^{10}$ | $3.22 \times 10^{11}$ | 3.8 | 0.2 | 85.6 | X |
| 16 | $2.11 \times 10^{10}$ | $8.88 \times 10^{11}$ | 3.2 | 1.0 | 224.2 | X |
| 17 | $6.68 \times 10^{11}$ | $7.07 \times 10^{12}$ | 4.4 | 0.8 | 56.7 | X |

Comparison of Examples (Table 6) containing Component (C) with Comparative Examples (Table 7) not containing it shows clearly that Examples (Table 6) are smaller in the variation of surface resistivity of the product and has superior charge attenuation characteristics. Moreover, the Examples containing Component (C) were superior to Component (C)-free Comparative Examples, showing higher Izod impact strength values, higher thermal deformation temperatures and more satisfactory mechanical properties. The results of the crosshatch test are evidence of the superior homogeneity of the resin composition of the present invention.

Examples 18–30 and Comparative Examples 18–21

1. Production of Resin Compositions

Using a biaxial extruder (Kurimoto Ltd., KRC-Kneader S-II) equipped with a quantitative feeder, the styrenic thermoplastic resins [Component (A)] shown in Table 8 and the cationic copolymers [Component (B)] and copolymers [Component (C)] obtained in Examples of Synthesis were kneaded together in various combinations and extruded at 210° C. (provided, however, that ABS/PA and ABS/PC were kneaded and injection-molded at 250° C.) and cut cold to provide pelletized compositions.

Using an injection molding machine (Hypershot 3000, Niigata Engineering Co., Ltd.), each pelletized composition was molded at 210° C. The resulting testpieces were subjected to the same tests as described in the foregoing examples.

As comparative examples, Component C-free resin compositions were prepared and molded and the resulting testpieces were tested, all as described hereinbefore.

The test data are presented in Table 9.

TABLE 8

| No. | Component (A) (parts by weight) | Component (B) (parts by weight) | Component (C) (parts by weight) | |
|---|---|---|---|---|
| Example 18 | HIPS (100) | Example of Synthesis-a(3) | Example of Synthesis-6 | (0.1) |
| Example 19 | HIPS (100) | Example of Synthesis-b(5) | Copolymer 6 | (0.5) |
| Example 20 | HIPS (100) | Example of Synthesis-c(2) | Copolymer 5 | (1.0) |
| Example 21 | HIPS (100) | Example of Synthesis-d(3) | Copolymer 3 | (2.0) |
| Comparative example 18 | HIPS (100) | Example of Synthesis-d(3) | | |
| Example 22 | ABS (100) | Example of Synthesis-a(5) | Example of Synthesis-6 | (0.5) |
| Example 23 | ABS (100) | Example of Synthesis-b(6) | Copolymer 3 | (0.3) |
| Example 24 | ABS (100) | Example of Synthesis-b(6) | Copolymer 6 | (0.5) |
| Comparative example 19 | ABS (100) | Example of Synthesis-b(6) | | |

TABLE 8-continued

| No. | Component (A) (parts by weight) | Component (B) (parts by weight) | Component (C) (parts by weight) | |
|---|---|---|---|---|
| Example 25 | ABS (100) | Example of Synthesis-c(2) | Copolymer 5 | (0.8) |
| Example 26 | ABS/PC (100) | Example of Synthesis-c(3) | Copolymer 4 | (1.0) |
| Example 27 | ABS/PC (100) | Example of Synthesis-a(5) | Copolymer 3 | (0.5) |
| Comparative example 20 | ABS/PC (100) | Example of Synthesis-a(5) | — | |
| Example 28 | ABS/PBT (100) | Example of Synthesis-c(2) | Copolymer 6 | (1.0) |
| Example 29 | ABS/PBT (100) | Example of Synthesis-a(5) | Example of Synthesis-6 | (1.0) |
| Comparative example 21 | ABS/PBT (100) | Example of Synthesis-a(5) | — | |
| Example 30 | ABS/PA (100) | Example of Synthesis-c(3) | Example of Synthesis-6 | (2.0) |

TABLE 9

| No. | Surface Resistivity ($\Omega$) | | | | | | | | | Charge Attenuation Rate(s) | Izod Impact Strength | Heat Resistance | Cross-hatch Test |
|---|---|---|---|---|---|---|---|---|---|---|---|---|---|
| | A | B | C | D | E | F | G | H | I | | | | |
| Example 18 | $8.51 \times 10^{12}$ | $5.61 \times 10^{11}$ | $5.16 \times 10^{12}$ | $3.69 \times 10^{11}$ | $1.02 \times 10^{11}$ | $2.06 \times 10^{11}$ | $2.17 \times 10^{11}$ | $1.01 \times 10^{11}$ | $3.57 \times 10^{11}$ | 4.8 | 7.8 | 83.0 | ○ |
| Example 19 | $5.61 \times 10^{12}$ | $3.65 \times 10^{12}$ | $4.18 \times 10^{12}$ | $2.76 \times 10^{11}$ | $8.96 \times 10^{10}$ | $4.51 \times 10^{11}$ | $1.01 \times 10^{12}$ | $5.81 \times 10^{10}$ | $7.19 \times 10^{11}$ | 3.0 | 7.9 | 82.7 | ○ |
| Example 20 | $1.08 \times 10^{12}$ | $5.56 \times 10^{11}$ | $7.43 \times 10^{11}$ | $8.16 \times 10^{11}$ | $4.49 \times 10^{11}$ | $1.01 \times 10^{12}$ | $1.00 \times 10^{12}$ | $3.05 \times 10^{11}$ | $1.03 \times 10^{12}$ | 1.9 | 8.0 | 83.5 | ○ |
| Example 21 | $4.76 \times 10^{12}$ | $3.18 \times 10^{12}$ | $5.36 \times 10^{12}$ | $3.98 \times 10^{12}$ | $8.95 \times 10^{11}$ | $2.43 \times 10^{12}$ | $3.61 \times 10^{12}$ | $7.15 \times 10^{11}$ | $1.00 \times 10^{12}$ | 4.0 | 7.0 | 83.4 | ○ |
| Comparative Example 18 | $3.61 \times 10^{16}$ | $1.00 \times 10^{16}$ | $4.11 \times 10^{16}$ | $5.66 \times 10^{16}$ | $2.91 \times 10^{16}$ | $4.40 \times 10^{16}$ | $7.10 \times 10^{16}$ | $3.20 \times 10^{16}$ | $1.05 \times 10^{16}$ | ∞ | 7.9 | 82.0 | ○ |
| Example 22 | $1.00 \times 10^{12}$ | $5.66 \times 10^{12}$ | $1.02 \times 10^{13}$ | $7.84 \times 10^{12}$ | $3.56 \times 10^{12}$ | $6.51 \times 10^{12}$ | $5.36 \times 10^{12}$ | $2.10 \times 10^{12}$ | $4.08 \times 10^{12}$ | 5.0 | 20.0 | 87.4 | ○ |
| Example 23 | $7.11 \times 10^{12}$ | $4.21 \times 10^{12}$ | $6.66 \times 10^{12}$ | $4.39 \times 10^{12}$ | $8.16 \times 10^{11}$ | $3.11 \times 10^{12}$ | $7.00 \times 10^{11}$ | $5.68 \times 10^{11}$ | $6.79 \times 10^{11}$ | 3.9 | 21.0 | 87.0 | ○ |
| Example 24 | $1.00 \times 10^{12}$ | $8.51 \times 10^{11}$ | $1.05 \times 10^{11}$ | $6.51 \times 10^{11}$ | $1.03 \times 10^{11}$ | $4.28 \times 10^{11}$ | $5.61 \times 10^{11}$ | $1.00 \times 10^{11}$ | $5.43 \times 10^{11}$ | 1.8 | 21.0 | 87.0 | ○ |
| Comparative Example 19 | $1.07 \times 10^{16}$ | $4.11 \times 10^{16}$ | $1.07 \times 10^{16}$ | $2.10 \times 10^{16}$ | $2.41 \times 10^{16}$ | $1.00 \times 10^{16}$ | $1.00 \times 10^{16}$ | $1.01 \times 10^{16}$ | $2.10 \times 10^{16}$ | ∞ | 20.0 | 87.0 | ○ |
| Example 25 | $3.66 \times 10^{12}$ | $1.00 \times 10^{12}$ | $2.89 \times 10^{12}$ | $2.64 \times 10^{12}$ | $5.41 \times 10^{11}$ | $1.00 \times 10^{12}$ | $1.06 \times 10^{12}$ | $4.81 \times 10^{11}$ | $1.00 \times 10^{11}$ | 2.5 | 20.0 | 87.5 | ○ |
| Example 26 | $1.81 \times 10^{13}$ | $5.96 \times 10^{12}$ | $7.19 \times 10^{12}$ | $8.41 \times 10^{12}$ | $8.99 \times 10^{11}$ | $5.61 \times 10^{12}$ | $4.37 \times 10^{12}$ | $7.89 \times 10^{11}$ | $9.89 \times 10^{11}$ | 5.3 | 36.0 | 104.0 | ○ |
| Example 27 | $1.05 \times 10^{13}$ | $7.91 \times 10^{12}$ | $9.98 \times 10^{12}$ | $5.61 \times 10^{12}$ | $9.00 \times 10^{11}$ | $9.56 \times 10^{11}$ | $7.19 \times 10^{11}$ | $5.84 \times 10^{11}$ | $8.65 \times 10^{11}$ | 5.1 | 38.0 | 103.6 | ○ |
| Comparative Example 20 | $1.07 \times 10^{16}$ | $2.00 \times 10^{16}$ | $1.09 \times 10^{16}$ | $5.16 \times 10^{16}$ | $4.18 \times 10^{16}$ | $1.05 \times 10^{16}$ | $8.10 \times 10^{16}$ | $6.51 \times 10^{16}$ | $1.07 \times 10^{16}$ | ∞ | 36.0 | 103.0 | ○ |
| Example 28 | $9.51 \times 10^{12}$ | $5.61 \times 10^{11}$ | $8.99 \times 10^{12}$ | $9.00 \times 10^{12}$ | $8.99 \times 10^{11}$ | $6.51 \times 10^{12}$ | $3.91 \times 10^{12}$ | $5.16 \times 10^{11}$ | $9.98 \times 10^{11}$ | 4.9 | 26.0 | 89.0 | ○ |
| Example 29 | $6.51 \times 10^{12}$ | $1.08 \times 10^{12}$ | $6.99 \times 10^{12}$ | $5.16 \times 10^{12}$ | $3.11 \times 10^{12}$ | $5.71 \times 10^{12}$ | $4.29 \times 10^{12}$ | $9.10 \times 10^{11}$ | $3.41 \times 10^{12}$ | 4.8 | 27.0 | 88.9 | ○ |
| Comparative Example 21 | $1.00 \times 10^{16}$ | $1.12 \times 10^{16}$ | $1.00 \times 10^{16}$ | $1.03 \times 10^{16}$ | $1.05 \times 10^{16}$ | $1.00 \times 10^{16}$ | $2.16 \times 10^{16}$ | $1.98 \times 10^{16}$ | $1.07 \times 10^{16}$ | ∞ | 21.0 | 88.5 | ○ |
| Example 30 | $3.60 \times 10^{12}$ | $7.90 \times 10^{11}$ | $1.09 \times 10^{12}$ | $7.77 \times 10^{11}$ | $5.34 \times 10^{11}$ | $5.11 \times 10^{11}$ | $5.77 \times 10^{11}$ | $9.10 \times 10^{10}$ | $4.19 \times 10^{11}$ | 2.8 | 11.0 | 91.0 | ○ |

It is apparent from Table 9 that the required amount of Component (B) can be decreased by using a styrenic thermoplastic resin as Component (A) and a herein-specified copolymer as Component (C).

Application Example 1 (an electrically conductive plastic sheet)

Using a biaxial extruder (KRC Kneader S-II), 100 parts of polystyrene (SC001, Asahi Chemical Industry) [Component (A)], 3 parts of the cationic copolymer obtained in Example of Synthesis-c [Component (B)], and 1 part of copolymer 2 [Component (C)] were kneaded at 210° C. and extruded to provide a pelletized composition (A).

Using a monoaxial extruder (Plastic Engineering institute PLABOR) fitted with a T die, the above pelletized composition (A) was extruded at 220° C. to provide a plastic sheet (0.3 mm thick).

The surface resistivity of this plastic sheet was $1.35 \times 10^{10}$ Ω and the charge attenuation half-life was 0.5 second. It is, therefore, obvious that the above plastic sheet can be used with advantage as a base sheet for the IC carrier tape.

Application Example 2 (an IC carrier tape)

An IC carrier tape was manufactured from the plastic sheet obtained in Application Example 1, injection-molding pelletized composition (A) by the method described in JP-A-07132962 and attaching IC-mounting microribs. The surface resistivity (between the sheet and the microribs) was $2.00 \times 10^{10}$ Ω.

Application Example 3 (an IC tray)

Using a biaxial extruder (KRC Kneader S-II), 100 parts of HIPS [Component (A)], 3 parts of the cationic copolymer synthesized in Example of Synthesis-a [Component (B)], 0.5 part of copolymer 2 [Component (C)], and 5 parts of mica particles surface-treated with γ-aminopropyltrimethoxysilane (average particle diameter= 90 μm, aspect ratio=50) were kneaded to provide pelletized composition (B).

Then, using an injection machine (NN-MI4000, Niigata Engineering Co., Ltd.), the above pelletized Composition (B) was injection-molded to provide an IC tray sized 150 mm×150 mm×10 mm.

The IC tray was evaluated by the following methods. The results are presented in Table 10.

(1) Surface Resistivity

Using Hi-Rester (Mitsubishi Petrochemical Company, Ltd.), the resistance was measured in 3 random positions of the IC tray and the mean value (Ω) was used for evaluation.

(2) Weld Strength

The welded part of the IC tray was bent by both hands and the incidence and condition of breakage were evaluated.

(3) Curling and Strain

The IC tray was placed on a platen and using a thickness gauge and a height gauge, the curl (mm) in the center and the strain were measured.

(4) Strength Test

Ten units of the IC tray were stacked up and using a tying machine, the stack was tied with a 9 mm-wide polypropylene (PP) band under a tension force of 10 kgf. The incidence of cracks of the IC tray was rated.

(5) Moldability

The reject rate in the production of the IC tray was used as an indicator of moldability.

TABLE 10

| Test item | Result |
| --- | --- |
| (1) Surface resistivity of end product | $1.2 \times 10^{11}$Ω |
| (2) Weld strength of end product | Not cracked |
| (3) Curl and strain of end product | 0.3 mm, no strain |
| (4) Strength test | Not cracked |
| (5) Moldability | 0/100 (no reject) |

Examples 31–44

Using a biaxial extruder (Kurimoto Ltd., KRC Kneader S-II) equipped with a quantitative feeder, the styrenic thermoplastic resins [Component (A)] shown in Table 11 and the cationic copolymers [Component (B)] and copolymers [Component (C)] synthesized in Examples of Synthesis were kneaded and extruded in various combinations and cut cold to provide pelletized compositions.

Each pelletized composition was injection-molded using an injection molding machine [Niigata Engineering Co., Ltd., Hypershot 3000] and the resulting testpieces were subjected to the same tests as described hereinbefore. The data generated are presented in Table 12.

TABLE 11

| No. | Component (A) (parts by weight) | Component (B) (parts by weight) | Component (C) (parts by weight) | |
| --- | --- | --- | --- | --- |
| Example 31 | ABS (100) | Example of Synthesis-b(10) | Copolymer 2 | (3.0) |
| Example 32 | ABS (100) | Example of Synthesis-b(5) | Copolymer 2 | (1.0) |
| Example 33 | ABS (100) | Example of Synthesis-c(10) | Copolymer 3 | (3.0) |
| Example 34 | ABS (100) | Example of Synthesis-c(4) | Copolymer 3 | (1.0) |
| Example 35 | ABS (100) | Example of Synthesis-c(10) | Copolymer 6 | (3.0) |
| Example 36 | ABS (100) | Example of Synthesis-c(4) | Copolymer 6 | (0.5) |
| Example 37 | HIPS (100) | Example of Synthesis-a(10) | Copolymer 5 | (3.0) |
| Example 38 | HIPS (100) | Example of Synthesis-a(3) | Copolymer 5 | (1.0) |
| Example 39 | HIPS (100) | Example of Synthesis-c(10) | Copolymer 4 | (3.0) |
| Example 40 | HIPS (100) | Example of Synthesis-c(2) | Copolymer 4 | (1.0) |
| Example 41 | ABS/PC (100) | Example of Synthesis-c(10) | Copolymer 5 | (3.0) |
| Example 42 | ABS/PC (100) | Example of Synthesis-c(5) | Copolymer 5 | (1.0) |
| Example 43 | ABS/PC (100) | Example of Synthesis-d(10) | Copolymer 6 | (3.0) |
| Example 44 | ABS/PC (100) | Example of Synthesis-d(5) | Copolymer 6 | (1.0) |

TABLE 12

| No. | Surface Resistivity (Ω) | | | | | | |
|---|---|---|---|---|---|---|---|
| | A | B | C | D | E | F | G |
| Example 31 | $7.90 \times 10^{12}$ | $3.01 \times 10^{12}$ | $5.10 \times 10^{12}$ | $2.10 \times 10^{12}$ | $9.60 \times 10^{11}$ | $4.81 \times 10^{12}$ | $6.51 \times 10^{11}$ |
| Example 32 | $7.11 \times 10^{12}$ | $4.21 \times 10^{12}$ | $6.66 \times 10^{12}$ | $4.39 \times 10^{12}$ | $8.16 \times 10^{11}$ | $3.11 \times 10^{12}$ | $7.00 \times 10^{11}$ |
| Example 33 | $7.60 \times 10^{12}$ | $7.91 \times 10^{11}$ | $4.68 \times 10^{12}$ | $8.16 \times 10^{11}$ | $6.91 \times 10^{11}$ | $6.50 \times 10^{11}$ | $8.55 \times 10^{11}$ |
| Example 34 | $8.10 \times 10^{12}$ | $8.11 \times 10^{11}$ | $3.18 \times 10^{12}$ | $8.00 \times 10^{11}$ | $6.50 \times 10^{11}$ | $7.00 \times 10^{11}$ | $8.43 \times 10^{11}$ |
| Example 35 | $6.80 \times 10^{12}$ | $1.00 \times 10^{12}$ | $4.56 \times 10^{12}$ | $8.10 \times 10^{11}$ | $7.13 \times 10^{11}$ | $7.99 \times 10^{11}$ | $7.68 \times 10^{11}$ |
| Example 36 | $5.68 \times 10^{12}$ | $8.19 \times 10^{11}$ | $3.55 \times 10^{12}$ | $9.03 \times 10^{11}$ | $8.14 \times 10^{11}$ | $7.00 \times 10^{11}$ | $8.00 \times 10^{11}$ |
| Example 37 | $6.50 \times 10^{11}$ | $4.80 \times 10^{10}$ | $4.56 \times 10^{11}$ | $6.30 \times 10^{10}$ | $5.50 \times 10^{10}$ | $6.10 \times 10^{11}$ | $6.18 \times 10^{10}$ |
| Example 38 | $7.00 \times 10^{11}$ | $3.90 \times 10^{10}$ | $5.18 \times 10^{11}$ | $7.89 \times 10^{10}$ | $6.00 \times 10^{10}$ | $6.00 \times 10^{11}$ | $5.98 \times 10^{10}$ |
| Example 39 | $8.00 \times 10^{10}$ | $5.61 \times 10^{10}$ | $6.14 \times 10^{10}$ | $6.18 \times 10^{9}$ | $5.78 \times 10^{9}$ | $6.10 \times 10^{9}$ | $6.28 \times 10^{9}$ |
| Example 40 | $9.91 \times 10^{10}$ | $7.61 \times 10^{10}$ | $6.14 \times 10^{10}$ | $5.18 \times 10^{9}$ | $6.43 \times 10^{9}$ | $5.87 \times 10^{9}$ | $5.84 \times 10^{9}$ |
| Example 41 | $4.06 \times 10^{12}$ | $4.99 \times 10^{11}$ | $3.81 \times 10^{12}$ | $4.10 \times 10^{11}$ | $3.89 \times 10^{11}$ | $3.37 \times 10^{11}$ | $3.81 \times 10^{11}$ |
| Example 42 | $4.46 \times 10^{12}$ | $5.19 \times 10^{11}$ | $4.45 \times 10^{12}$ | $5.10 \times 10^{11}$ | $3.58 \times 10^{11}$ | $4.44 \times 10^{11}$ | $4.13 \times 10^{11}$ |
| Example 43 | $5.61 \times 10^{12}$ | $5.11 \times 10^{11}$ | $4.99 \times 10^{12}$ | $8.12 \times 10^{11}$ | $5.56 \times 10^{11}$ | $4.15 \times 10^{11}$ | $6.68 \times 10^{11}$ |
| Example 44 | $5.00 \times 10^{11}$ | $7.10 \times 10^{11}$ | $6.40 \times 10^{11}$ | $7.08 \times 10^{11}$ | $6.10 \times 10^{11}$ | $3.88 \times 10^{11}$ | $5.07 \times 10^{11}$ |

| No. | Surface Resistivity (Ω) | | Charge Attenuation Rate(s) | Izod Impact Strength | Heat Resistance | Cross-hatch Test |
|---|---|---|---|---|---|---|
| | H | I | | | | |
| Example 31 | $8.99 \times 10^{11}$ | $7.91 \times 10^{11}$ | 2.6 | 21.0 | 87.0 | ○ |
| Example 32 | $5.68 \times 10^{11}$ | $6.79 \times 10^{11}$ | 2.5 | 21.9 | 87.0 | ○ |
| Example 33 | $5.71 \times 10^{11}$ | $5.96 \times 10^{11}$ | 1.9 | 21.4 | 87.2 | ○ |
| Example 34 | $5.08 \times 10^{11}$ | $6.36 \times 10^{11}$ | 1.9 | 21.9 | 87.3 | ○ |
| Example 35 | $6.51 \times 10^{11}$ | $6.00 \times 10^{11}$ | 1.6 | 21.0 | 87.0 | ○ |
| Example 36 | $5.97 \times 10^{11}$ | $7.00 \times 10^{11}$ | 1.6 | 21.9 | 87.4 | ○ |
| Example 37 | $2.36 \times 10^{10}$ | $3.60 \times 10^{10}$ | 0.6 | 8.0 | 83.0 | ○ |
| Example 38 | $3.81 \times 10^{10}$ | $3.10 \times 10^{10}$ | 0.6 | 8.4 | 83.5 | ○ |
| Example 39 | $3.54 \times 10^{10}$ | $4.81 \times 10^{9}$ | 0.6 | 8.2 | 83.3 | ○ |
| Example 40 | $4.00 \times 10^{10}$ | $5.00 \times 10^{9}$ | 0.6 | 8.5 | 83.5 | ○ |
| Example 41 | $1.99 \times 10^{11}$ | $3.00 \times 10^{11}$ | 0.9 | 38.8 | 103.5 | ○ |
| Example 42 | $2.51 \times 10^{11}$ | $3.00 \times 10^{11}$ | 0.9 | 39.0 | 104.0 | ○ |
| Example 43 | $3.70 \times 10^{11}$ | $4.89 \times 10^{11}$ | 1.0 | 38.5 | 103.0 | ○ |
| Example 44 | $4.00 \times 10^{11}$ | $4.40 \times 10^{11}$ | 1.0 | 38.8 | 103.5 | ○ |

It is apparent from Table 12 that the use of a styrenic thermoplastic resin as Component (A) enables reducing the amounts of the other components, namely Component (B) and Component (C). (With reduced amounts of (B) and (C), a comparable satisfactory result can be obtained).

The present invention thus provides a thermoplastic resin composition providing for very satisfactory thermal characteristics (for example, less liable to undergo deformation under heat) and antistatic properties with a minimum of local variation even when used in the manufacture of products of large surface area (that is to say a greater intra-product uniformity of antistatic properties), with a reduced addition level of an antistatic agent.

Since the cationic polymer (B) exists in a continual layer near the surface of matrix resin, the built-in antistatic properties are hardly decreased by abrasion and washing of the resin surface, so that a resin composition with improved abrasion resistance and water resistance can be insured. Moreover, since the antistatic component (B) is precluded from bleeding out on the resin surface, the resin surface does not become tacky or deteriorate in printability.

Incorporation of said copolymer component having a specified structure, namely Component (C), results in a uniform fine dispersion of the cationic polymer (B) in the matrix resin so that a uniform distribution of antistatic properties is obtained. Furthermore, compared with the case without Compound (C), the use of Component (C) provides the additional advantage that the amount of antistatic Component (B) can be reduced to attain a given antistatic performance (the same order of surface resistivity).

Furthermore, addition of Component (C) contributes to a uniform fine dispersion of cationic copolymer (B) so that the mechanical properties of the resin are substantially not affected.

What is claimed is:

1. A thermoplastic resin composition comprising
(A) 100 parts by weight of a thermoplastic resin,
(B) 3–30 parts by weight of a cationic copolymer comprising a structural unit of formula (1) and a structural unit of formula (3)

    (1)

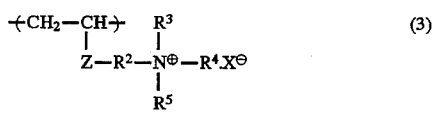    (3)

(wherein Z represents

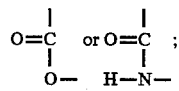

$R^2$ represents ethylene or propylene; $R^3$ and $R^4$ independently represent methyl; $R^5$ represents linear lower alkyl or aralkyl; X represents halogen, $CH_3OSO_3$, $CH_3CH_2OSO_3$, or $R^6SO_3$, where $R^6$ represents $C_{1-8}$ alkyl or aralkyl), said ethylene unit of formula (1) and cationic unit of formula (3) accounting for 80–98 mol % and 2–20 mol %, respectively, of the copolymer, and having a weight-average molecular weight of 1,000–50,000, and (C) 0.1–10 parts by weight of a copolymer comprising at least one unit each per molecule of a unit of formula (4)

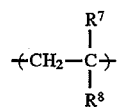 (4)

(wherein $R^7$ represents hydrogen or methyl; $R^8$ represents hydrogen, $C_{1-42}$ alkyl, phenyl, or $COOR^9$, where $R^9$ represents $C_{1-4}$ alkyl) and a unit of formula (5)

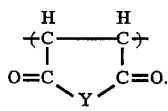 (5)

(wherein Y represents O or $N-R^{10}$, where $R^{10}$ represents hydrogen, $C_{1-14}$ alkyl, aryl, aralkyl, $R^2-N^{\oplus}R^3R^4R^5.X^{\ominus}$, or $R^2-NR^3R^4$; $R^2-R^5$ and X are as defined hereinbefore) and having a weight-average molecular weight of 800–200,000.

2. A thermoplastic resin composition comprising (A) 100 parts by weight of a thermoplastic resin, (B) 3–30 parts by weight of a cationic copolymer comprising a structural unit of formula (1), a structural unit of formula (2), and a structural unit of formula (3)

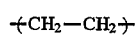 (1)

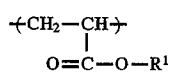 (2)

(wherein $R^1$ represents methyl or ethyl and may be the same or different over all structural units)

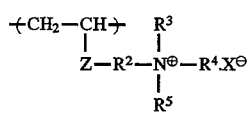 (3)

(wherein Z represents

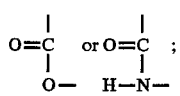 ;

$R^2$ represents ethylene or propylene; $R^3$ and $R^4$ independently represent methyl; $R^5$ represents linear lower alkyl or aralkyl; X represents halogen, $CH_3OSO_3$, $CH_3CH_2OSO_3$, or $R^6SO_3$, where $R^6$ represents $C_{1-8}$ alkyl or aralkyl), said ethylene unit of formula (1), acrylate unit of formula (2), and cationic unit of formula (3) accounting for 79.9–97.9 mol %, not more than 15 mol %, and 2–20 mol %, respectively, of the copolymer, and having a weight-average molecular weight of 1,000–50,000, end (C) 0.1–10 parts by weight of a copolymer comprising at least one unit each per molecule of a structural unit of formula (4) and a structural unit of formula (5)

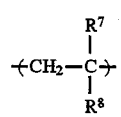 (4)

(wherein $R^7$ represents hydrogen or methyl; $R^8$ represents hydrogen, $C_{1-42}$ alkyl, phenyl, or $COOR^9$, where $R^9$ represents $C_{1-4}$ alkyl)

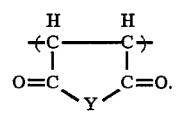 (5)

(wherein Y represents O or $N-R^{10}$, where $R^{10}$ represents hydrogen, $C_{1-14}$ alkyl, aryl, aralkyl, $R^2-N^{\oplus}R^3R^4R^5.X^{\ominus}$, or $R^2-NR^3R^4$; $R^2-R^5$ and X are as defined hereinbefore) and having a weight-average molecular weight of 800–200,000.

3. A thermoplastic resin composition comprising (A) 100 parts by weight of a styrenic thermoplastic resin, (B) 1–15 parts by weight of an antistatic cationic copolymer comprising a structural unit of formula (1) and a structural unit of formula (3),

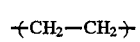 (1)

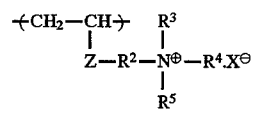 (3)

(wherein Z represents

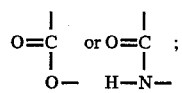 ;

$R^2$ represents ethylene or propylene; $R^3$ and $R^4$ independently represent methyl; $R^5$ represents linear lower alkyl or aralkyl; X represents halogen, $CH_3OSO_3$, $CH_3CH_2OSO_3$, or $R^6SO_3$, where $R^6$ represents $C_{1-8}$ alkyl or aralkyl), said ethylene unit of formula (1) and cationic unit of formula (3) accounting for 80–98 mol % and 2–20 mol %, respectively, of the copolymer, and having a weight-average molecular weight of 1,000–50,000, and (C) 0.05–5 parts by weight of a copolymer comprising at least one unit each per molecule of a structural unit of formula (4) and a succinic anhydride unit of formula (5) either in the backbone chain or in a side chain

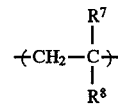 (4)

(wherein $R^7$ represents hydrogen or methyl; $R^8$ represents hydrogen or $C_{1-42}$ alkyl and may mean a mixture hereof within the same copolymer molecule),

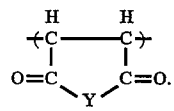 (5)

and having a weight-average molecular weight of 800–200,000.

4. A thermoplastic resin composition comprising (A) 100 parts by weight of a styrenic thermoplastic resin, (B) 1–15 parts by weight of an antistatic cationic copolymer comprising a structural unit of formula (1), a structural unit of formula (2), and a structural unit of formula (3),

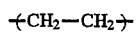 (1)

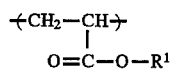 (2)

(wherein $R^1$ represents methyl or ethyl and may be the same or different over all structural units)

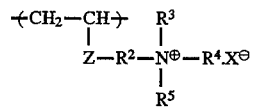 (3)

(wherein Z represents

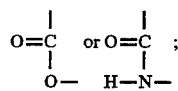 ;

$R^2$ represents ethylene or propylene; $R^3$ and $R^4$ independently represent methyl; $R^5$ represents linear lower alkyl or aralkyl; X represents halogen, $CH_3OSO_3$, $CH_3CH_2OSO_3$, or $R^6SO_3$, where $R^6$ represents $C_{1-8}$ alkyl or aralkyl), said ethylene unit of formula (1), acrylate unit of formula (2), and cationic unit of formula (3) accounting for 79.9–97.9 mol %, not more than 15 mol %, and 2–20 mol %, respectively, of the copolymer, and having a weight average molecular weight of 1,000–50,000, and (C) 0.05–5 parts by weight of a copolymer comprising at least one unit each per molecule of a structural unit of formula (4) and a structural unit of formula (5) either in its backbone chain or in a side chain

 (4)

(wherein $R^7$ represents hydrogen or methyl; $R^8$ represents hydrogen or $C_{1-42}$ alkyl and may mean a mixture thereof within the same copolymer molecule),

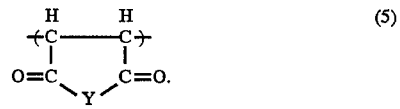 (5)

and having a weight-average molecular weight of 800–200,000.

* * * * *